United States Patent
Zhao et al.

(10) Patent No.: US 12,508,958 B2
(45) Date of Patent: Dec. 30, 2025

(54) JOINING STRUCTURE AND CHILD SAFETY SEAT INCLUDING THE SAME

(71) Applicant: WONDERLAND SWITZERLAND AG, Steinhausen (CH)

(72) Inventors: Guanghui Zhao, Guangdong (CN); Daliang Zhang, Guangdong (CN); Ganqing Fang, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 223 days.

(21) Appl. No.: 18/255,937

(22) PCT Filed: Dec. 3, 2021

(86) PCT No.: PCT/EP2021/084256
§ 371 (c)(1),
(2) Date: Jun. 5, 2023

(87) PCT Pub. No.: WO2022/117867
PCT Pub. Date: Jun. 9, 2022

(65) Prior Publication Data
US 2024/0101002 A1    Mar. 28, 2024

(30) Foreign Application Priority Data

Dec. 4, 2020    (CN) .......................... 202011411737.4
Sep. 22, 2021    (CN) .......................... 202111108106.X

(51) Int. Cl.
*B62B 9/14*    (2006.01)
*B60N 2/26*    (2006.01)
(Continued)

(52) U.S. Cl.
CPC ............. *B60N 2/2821* (2013.01); *B60N 2/26* (2013.01); *B60N 2/2851* (2013.01);
(Continued)

(58) Field of Classification Search
CPC ..... B62B 9/14; Y10T 403/59; Y10T 403/591; Y10T 403/599; F16B 21/16; H01R 13/5213; B60N 2/2821
See application file for complete search history.

(56) References Cited

U.S. PATENT DOCUMENTS 5,522,669 A  *  6/1996  Recker ..................... F16D 1/116
                                                      403/328
6,764,133 B2 *  7/2004  Osato ........................ A47D 1/08
                                                      297/184.13
(Continued)

FOREIGN PATENT DOCUMENTS

CN              2618833 Y      6/2004
CN           100548739 C      10/2009
(Continued)

OTHER PUBLICATIONS

Third Office Action in Corresponding Chinese Application No. 202011411737.4, dated Sep. 23, 2024; 16 pgs.
(Continued)

*Primary Examiner* — Syed A Islam
(74) *Attorney, Agent, or Firm* — HAUPTMAN HAM, LLP

(57) ABSTRACT

A joining structure including a fixed seat connected to a first object, the fixed seat has a side wall, and the side wall has an open end and an accommodating end disposed opposite each other; a socket connected to a second object and having a side wall, the socket insertable into the fixed seat side wall through the open end along an insertion direction to join the second object to the first object; a hole closing part disposed inside the fixed seat side wall, between the accommodating end and the socket of the fixed seat, and movable between the open end and the accommodating end, the hole closing part has a hole closing surface at the open end, and the hole
(Continued)

closing surface has a shape corresponding to a cross-sectional shape of the fixed seat side wall at the open end; and an elastic hole closing part.

21 Claims, 28 Drawing Sheets

(51) Int. Cl.
*B60N 2/28* (2006.01)
*F16B 21/16* (2006.01)
*H01R 13/52* (2006.01)

(52) U.S. Cl.
CPC ............... *B60N 2/2816* (2023.08); *B62B 9/14* (2013.01); *F16B 21/16* (2013.01); *H01R 13/5213* (2013.01); *Y10T 403/59* (2015.01)

(56) References Cited

U.S. PATENT DOCUMENTS

| | | |
|---|---|---|
| 2003/0106976 A1 | 6/2003 | Then et al. |
| 2010/0163088 A1 | 7/2010 | Zeng |
| 2020/0361348 A1 | 11/2020 | Mason et al. |
| 2021/0146809 A1 | 5/2021 | Cui |

FOREIGN PATENT DOCUMENTS

| | | |
|---|---|---|
| CN | 101682143 A | 3/2010 |
| CN | 201777288 U | 3/2011 |
| CN | 201907547 U | 7/2011 |
| CN | 202080319 U | 12/2011 |
| CN | 202536846 U | 11/2012 |
| CN | 101682143 B | 3/2013 |
| CN | 203032422 U | 7/2013 |
| CN | 103661553 A | 3/2014 |
| CN | 104097545 A | 10/2014 |
| CN | 102712269 B | 7/2015 |
| CN | 105449446 A | 3/2016 |
| CN | 205509117 U | 8/2016 |
| CN | 104097545 B | 4/2017 |
| CN | 206394687 U | 8/2017 |
| CN | 206841219 U | 1/2018 |
| CN | 207461824 U | 6/2018 |
| CN | 108437860 A | 8/2018 |
| CN | 108621882 A | 10/2018 |
| CN | 208336611 U | 1/2019 |
| CN | 208646952 U | 3/2019 |
| CN | 210707587 U | 6/2020 |
| CN | 111422110 A | 7/2020 |
| CN | 211107641 U | 7/2020 |
| CN | 211165558 U | 8/2020 |
| CN | 211166558 U | 8/2020 |
| CN | 111923796 A | 11/2020 |
| CN | 212555952 U | 2/2021 |
| EP | 3831649 A1 | 6/2021 |
| GB | 2415368 A | 12/2005 |
| GB | 2445628 A | 7/2008 |
| JP | 58009815 Y2 | 2/1983 |
| JP | H05027335 Y | 7/1993 |
| JP | H06135266 A | 5/1994 |
| JP | 2000071932 A | 3/2000 |
| JP | 2002240603 A | 8/2002 |
| JP | 3127412 U | 11/2006 |
| JP | 3127413 U | 11/2006 |
| JP | 2007015597 A | 1/2007 |
| JP | 2011183934 A | 9/2011 |
| JP | 2016150654 A | 8/2016 |
| JP | 2021079941 A | 5/2021 |
| TW | 1635002 B | 9/2018 |
| WO | 2005113281 A2 | 12/2005 |
| WO | 2015055846 A1 | 4/2015 |
| WO | 2021098710 A1 | 5/2021 |

OTHER PUBLICATIONS

Second Office Action issued in Chinese Patent Application No. 2020114117374; mailed May 31, 2024; 14 pgs.
First Office Action issued in Japanese Patent Application No. 2023-534243; mailed Jun. 18, 2024; 19 pgs.
First Office Action issued in Australia Patent Application No. 2021393787; mailed Jul. 15, 2024; 6 pgs.
Taiwan 1st Office Action issued in corresponding Taiwan Application No. 111135924, dated Jul. 18, 2023, pp. 1-4.
Taiwanese 1st Office Action issued in corresponding Taiwanese Application No. 110145200, dated Sep. 12, 2022, pp. 1-7.
Taiwanese 1st Office Action issued in corresponding Taiwanese Application No. 112109123, dated Aug. 31, 2023, pp. 1-13.
Chinese 1st Office Action issued in corresponding Chinese Application No. 202011411737.4, dated Jan. 26, 2024, pp. 1-9.
First Office Action in Corresponding European Application No. 21 830 419.4, dated Mar. 20, 2025; 11 pgs.
First Office Action in Corresponding Taiwan Application No. 113128453, dated Dec. 30, 2014; 16 pgs.
Notice of Allowance in Corresponding Chinese Application No. 202011411737.4, dated Jan. 17, 2025; 3 pgs.
Notice of Reasons for Refusal in Corresponding Japanese Application No. 2024-518384, dated May 27, 2025; 6 pgs.
First Office Action in Corresponding Taiwan Application No. 114116387, dated Jul. 22, 2025; 20 pgs.

* cited by examiner

JOINING STRUCTURE AND CHILD SAFETY SEAT INCLUDING THE SAME

TECHNICAL FIELD

The disclosure relates to a joining structure and a child safety seat including the joining structure.

BACKGROUND

A child safety seat is a common device that can be used in which children or infants of different ages sit. The child safety seat is designed for the safety of children in a car or other vehicle, it can restrain the dangerous behavior of the children in car during traveling, and protect the children from injury in the event of a sudden car collision or other accident. Child safety seats in the related art usually are not provided with a canopy, which is disadvantageous for use such as with convertible vehicles or the outdoor use of child safety seats. Even if a child safety seat is provided with a canopy, the canopy is usually designed to be fixedly installed on the seat, so it is not convenient to detach the canopy.

Child carriers, such as strollers, child safety seats and the like more and more tend to be equipped with canopy mechanisms to achieve the purposes of sunshine shading, sheltering from wind, and protecting privacy.

BRIEF DESCRIPTION OF THE DRAWINGS

The embodiments of the application will be described in detail below with reference to the accompanying drawings, in which.

DETAILED DESCRIPTION

The disclosure will be illustrated and described herein with reference to specific embodiments, the disclosure should not be limited to the details shown. Rather specifically, various modifications can be made to these details within the scope of the equivalent solutions of the claims and without departing from the disclosure.

The directional terms such as "front", "rear", "up", "down" and the like in the description are only used for easy understanding. The disclosure is not limited to these directional terms, but can be adjusted according to actual conditions. Although the present application is described with reference to the typical embodiments, the terms used are illustrative and examples rather than restrictive.

Figure 1:
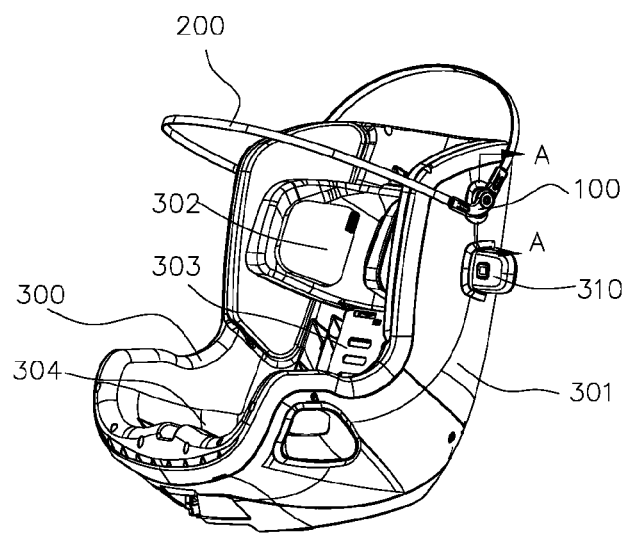
FIG. 1 is a perspective view showing a child safety seat according to an embodiment of the application, in which canopy rods are shown in a state of being joined to a seat body.
Figure 2:
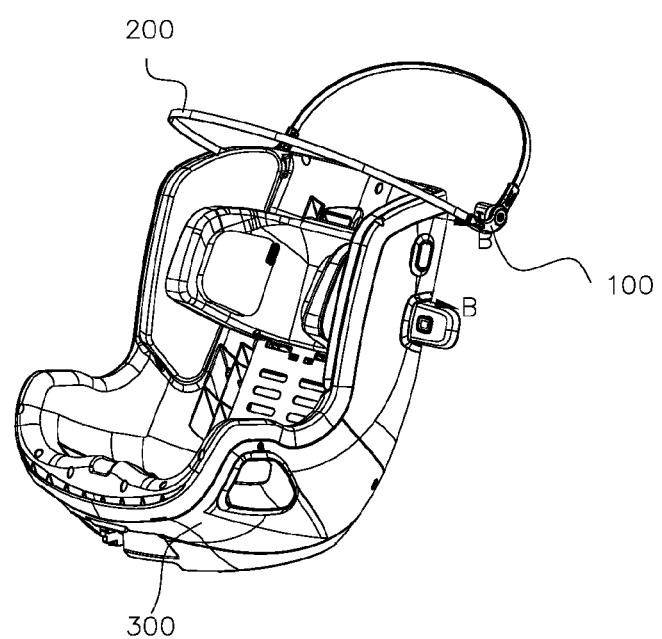
FIG. 2 is a perspective view showing the child safety seat according to an embodiment of the application, in which the canopy rods are shown in a state of being separated from the seat body.
Figure 3:
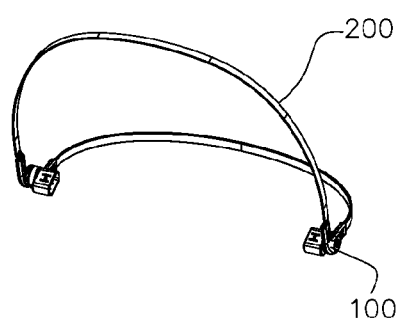
FIG. 3 shows a perspective view of a canopy of the child safety seat according to an embodiment of the application.
Figure 4A:
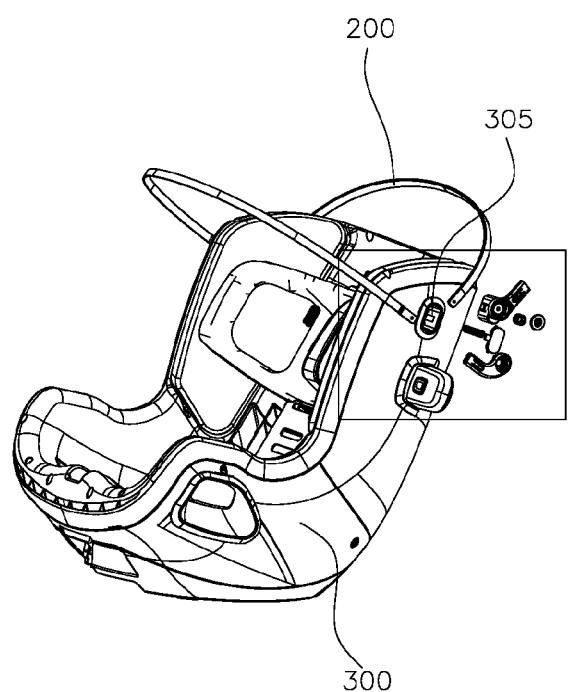
FIG. 4A shows a perspective view of the child safety seat according to an embodiment of the application, in which a joining structure is shown in an exploded view.

At first, a child safety seat according to an embodiment of the application will be described as a whole with reference to FIGS. 1 to 3. As shown, the child safety seat includes a seat body 300 having a case 301, a headrest portion 302, a backrest portion 303, and a seat portion 304. In addition, in this embodiment, opening and accommodating spaces 305 are disposed on both sides of the seat body 300 (see FIG. 4A). Moreover, the opening and accommodating spaces are located at positions on the case 301 opposite to an upper edge of the headrest portion 302. In some other embodiments, the opening and accommodating spaces 305 may be located on the case 301 correspondingly at positions between upper edge of the headrest portion 302 and upper edge of the case 301.

In some other embodiments, side impact protection blocks 310 are further disposed on both sides of the seat body 300. Moreover, in these embodiments, the opening and accommodating spaces are located at positions between the side impact protection blocks 310 and the upper edge of the case 301, but the disclosure is not limited to this configuration. The child safety seat disclosed in this embodiment further includes a canopy 200 and joining structures 100 connecting the seat body 300 and the canopy 200. Canopy rods of the canopy 200 are detachably joined to both left and right sides of the seat body 300 through the joining structures 100 of the application. The joining structures 100 may be separately or symmetrically disposed on both left and right sides of the seat body 300. Each of the joining structures 100 is divided into two parts, one part is mainly a fixed seat 110 embedded in the accommodating space 305, and the other part is mainly a socket 130 connected to one of the canopy rods.

In order to facilitate observation, only two canopy rods of the canopy 200 are shown, and the canopy rods are not shown with a canopy fabric mounted thereon. It should be noted, although the canopy of this embodiment is shown having two canopy rods, i.e., a first canopy rod 210 and a second canopy rod 220, and the two canopy rods can be rotated opposite to each other to collapse the canopy 200 (will be described in detail herein below), the joining structures 100 of the application is suitable for any number of the canopy rods, and is suitable for collapsible or non-collapsible canopy structure. Although the joining structures 100 of the application include a design that allows two canopy rods to be rotated opposite to each other, such design is not necessary, and can be varied accordingly based on the form of the canopy.

The components of the joining structure 100 of an embodiment of the application will now be generally described with reference to FIGS. 4A-5B.

As shown, each of the joining structures 100 includes a fixed seat 110, a socket 130, a hole closing part 120, a first canopy rod fixing part 140, and a second canopy rod fixing part 150, as well as a cover 160, an elastic hole closing part 161, and an elastic canopy rod 162. Among them, the fixed seat 110 is a component embedded in the seat body 300, the socket 130 is a component connected to the canopy 200, and the socket 130 may be inserted into the fixed seat 110 to install the canopy 200 onto the seat body 300. The hole closing part 120 is located in the fixed seat 110 and is used to close an opening of the fixed seat 110 when the socket 130 is not inserted into the fixed seat 110. the first canopy rod fixing part 140 and the second canopy rod fixing part 150 are connected to the socket 130 for being respectively connected to the first canopy rod 210 and the second canopy rod 220.

Figure 4B:
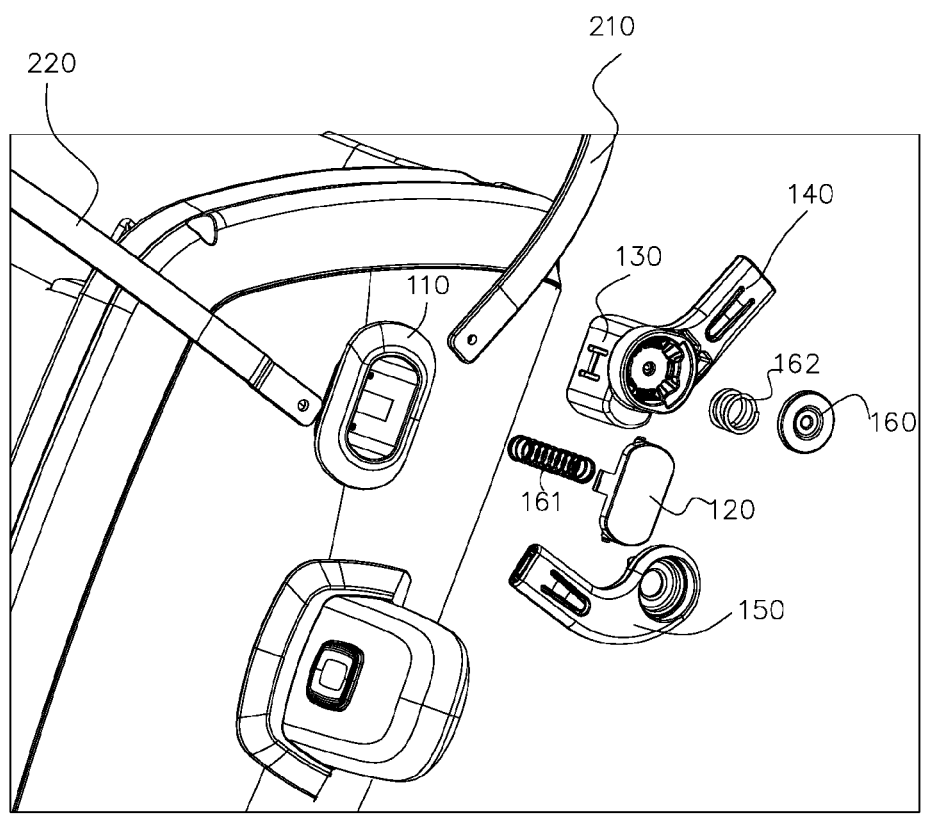
FIG. 4B is an enlarged view of the framed part in FIG. 4A.
Figure 5A:
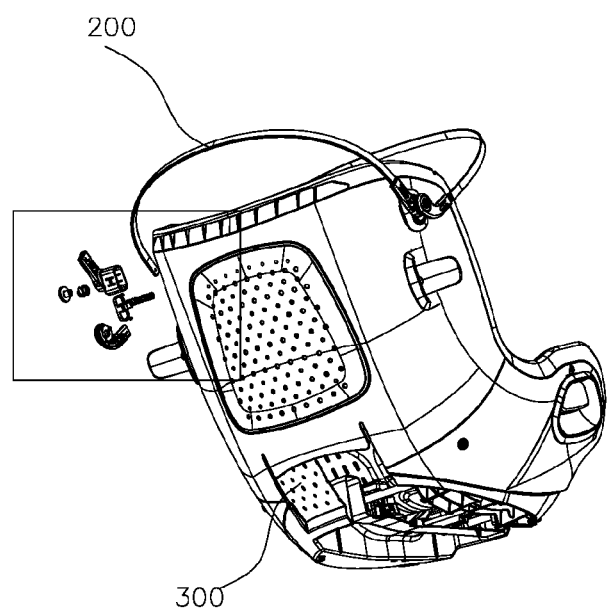
FIG. 5A shows a perspective view of the child safety seat according to an embodiment of the application from another angle, in which a joining structure is shown in an exploded view.
Figure 5B:
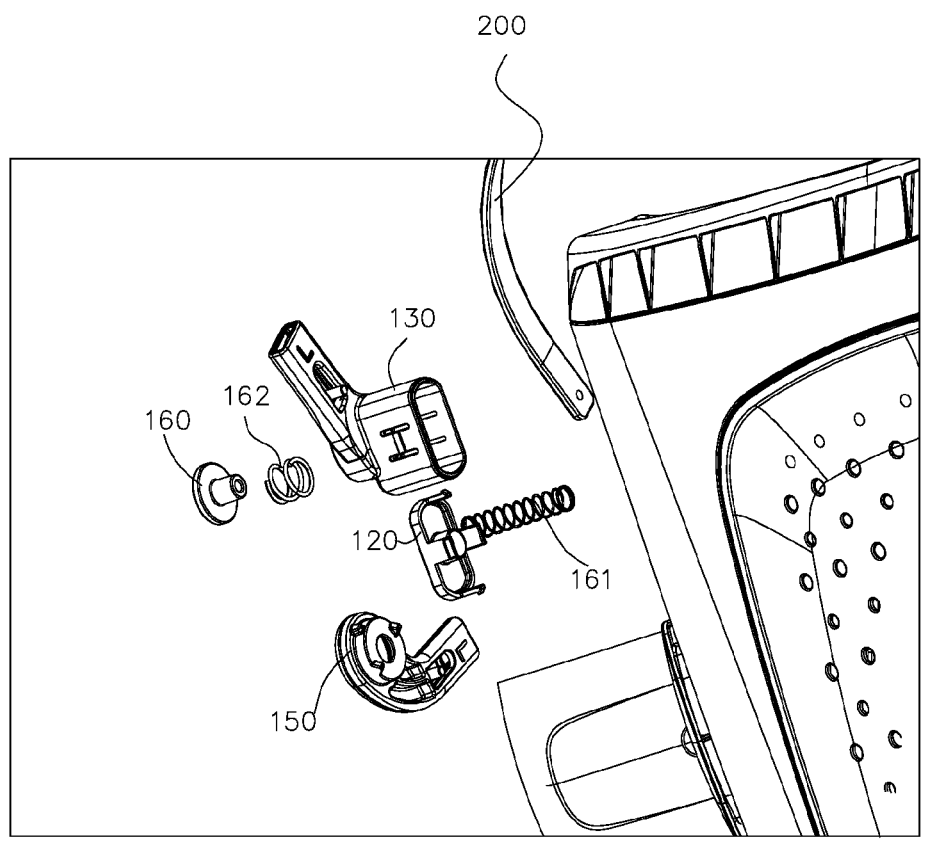
FIG. 5B is an enlarged view of the framed part in FIG. 5A.

Now the specific structure of the fixed seat 110 will be described with reference to FIGS. 4B, 9B, and 10B.

As shown, the fixed seat 110 has a cylindrical fixed seat side wall 112. The fixed seat side wall 112 has an open end 1121 and an accommodating end 1122 which are disposed opposite to each other. The fixed seat side wall 112 has a cross section of a non-circular structure, e.g., substantially in a shape of a rectangle, and a pair of opposite sides of the rectangle are arc-shaped edges. In this way, when the socket 130 having a shape corresponding to the fixed seat 110 is inserted into the fixed seat 110, the socket 130 can be prevented from rotating in the fixed seat 110. It should be understood that the fixed seat side wall 112 may also have other shapes, such as square, trapezoidal, oval or the like.

The fixed seat 110 also has a fixed seat edge 111, and the fixed seat edge 111 extends outward from an edge of the open end 1121 of the fixed seat side wall 112. The fixed seat edge 111 may facilitate fixing the fixed seat 110 to the seat body 300, and may decorate an appearance of the fixed seat 110. In an embodiment, the fixed seat edge 111 is upturned and extends from the open end 1121 of the fixed seat side wall 112 toward the accommodating end 1122, so as further facilitate fixing the fixed seat 110 to the seat body 300, and which may better transitionally combine the fixed seat 110 and the seat body 300.

The direction from the open end 1121 to the accommodating end 1122 of the fixed seat side wall 112 is called an insertion direction. In the insertion direction, the cross section of the fixed seat side wall 112 is approximately uniform. A stop portion 114 is disposed on an inner side of the fixed seat side wall 112. The stop portion 114 is located at a position between the open end 1121 and the accommodating end 1122, and protrudes inwardly from the inner side of the fixed seat side wall 112. The stop portion 114 may be close to the open end 1121, for example, the distance from the stop portion 114 to the open end 1121 in the insertion direction is about one-half to one-third of the total length of the fixed seat 110.

Figure 6A:
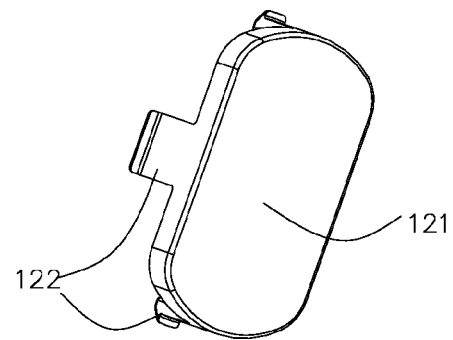
FIGS. 6A and 6B are respectively two perspective views of a hole closing part from different angles.
Figure 6B:
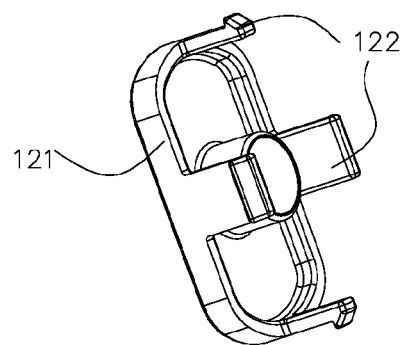

Now the specific structure of the hole closing part 120 will be described with reference to FIGS. 6A-6B.

As shown, the hole closing part 120 is a component inside the fixed seat side wall 112 and movable between the open end 1121 and the accommodating end 1122. The hole closing part 120 has a hole closing surface 121 at the open end 1121, and the hole closing surface 121 has a shape corresponds to the cross-sectional shape of the fixed seat side wall 112 at the open end 1121. In the illustrated embodiment, the hole closing part 120 is substantially in a shape of a plate. However, it should be understood, the hole closing part 120 may have a suitable shape, such as block or cone, as long as it is suitable for closing the hole closing surface 121 of the open end 1121.

In an embodiment, a barb 122 is disposed on the hole closing part 120. The barb 122 extends from the hole closing surface 121 toward the accommodating end 1122 and has a hook protruding toward the fixed seat side wall 112. The barb 122 is adapted to clasp on the stop portion 114 of the fixed seat side wall 112. When the hole closing part 120 is biased to the open end 1121 by elastic hole closing part 161, the barb 122 abuts against the stop portion 114 from a side of the accommodating end 1122, so as to prevent the hole closing part 120 from being separated from the fixed seat 110. In an embodiment, the hole closing part 120 has a plurality of barbs 122, and a plurality of stop portions 114 are disposed on a long side and/or a short side of the fixed seat side wall 112. The plurality of barbs 122 are respectively arranged to be corresponding to the stop portions 114 on the long side and/or the short side of the fixed seat side wall 112. In other embodiments, the stop positioning of the hole closing part 120 may be achieved in other forms, for example, the cross section of the open end 1121 may be set to be smaller than the hole closing surface 121, so as to prevent the hole closing part 120 from being separated from the fixed seat 110.

Figure 7A:
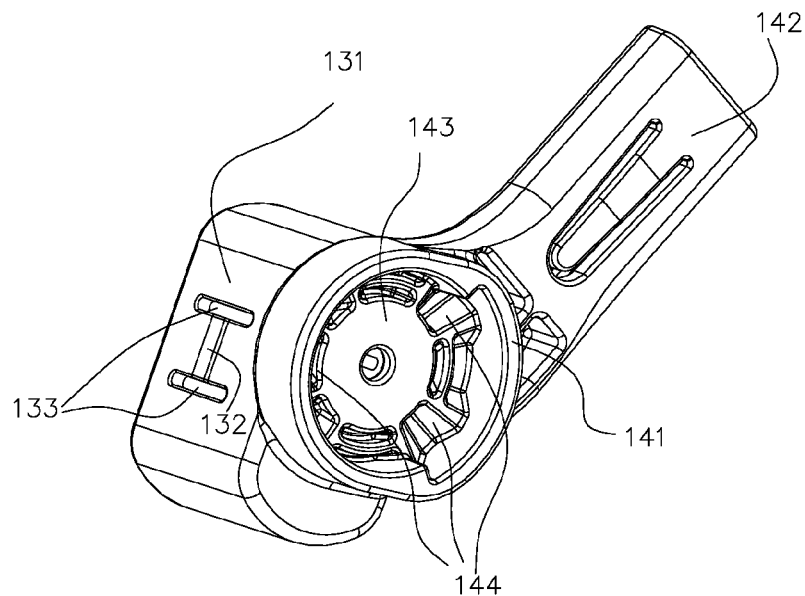
FIGS. 7A and 7B are respectively two perspective views of a socket and a first canopy rod fixing part from different angles.
Figure 7B:
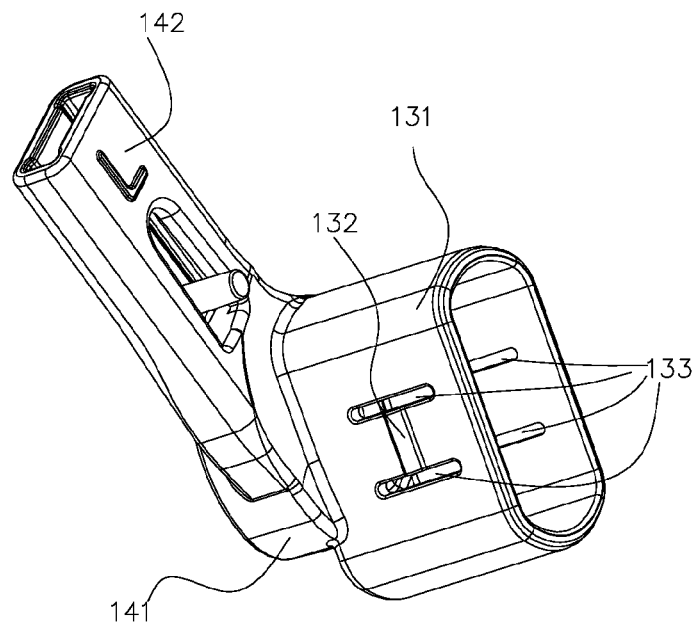

Now the specific structures of the socket 130 and the first canopy rod fixing part 140 will be described with reference to FIGS. 7A-7B.

It should be understood that although the socket 130 is disclosed as being assembled to the first canopy rod fixing part 140, the socket 130 may be applied to different objects according to one or more embodiments of the disclosure.

The socket 130 has a cylindrical socket side wall 131, such that the socket 130 can be inserted into the fixed seat side wall 112 along an insertion direction through the open end 1121. A protrusion 132 is disposed on an outer side of the socket side wall 131, and the protrusion 132 protrudes outward from the outer side of the socket side wall 131. When the socket 130 is inserted into the fixed seat 110, the protrusion 132 can transit the stop portion 114 to enter the fixed seat 110, and abut against the stop portion 114 from a side of the accommodating end 1122, so as to prevent the socket 130 from being separated from the fixed seat 110.

In an embodiment, the socket side wall 131 has a plurality of protrusions 132, and the plurality of protrusions 132 are respectively corresponding to the stop portions 114 on the long side and/or the short side of the fixed seat side wall 112. Such a design allows all sides of the socket 130 to be locked in the fixed seat 110, thereby increasing the stability of the canopy 200.

In an embodiment, the protrusion 132 extends on the socket side wall 131 along a direction perpendicular to the insertion direction and, at both ends of the protrusion 132, a slot 133 parallel to the insertion direction is respectively disposed on the socket side wall 131. Such a design allows the protrusion 132 to sag through elastic deformation, so as to facilitate crossing over the stop portion 114 during the insertion process of the socket 130. Moreover, when a user needs to pull out the socket 130, only a little force may take the protrusion 132 to transit the stop portion 114 and out of the fixed seat 110.

It should be understood that in other embodiments the socket 130 may be fixed to the fixed seat 110 in different ways, such as snap fit, friction fit or the like.

A first canopy fixing part 140 is attached to an outer surface of the socket 130 along the insertion direction. In this way, when the socket 130 is completely inserted into the fixed seat 110, the first canopy fixing part 140 is close to a side of the seat body 300 and partially shields the joining structures 100, such that the entire joining structure 100 has only a small portion exposed to the outside, thereby forming a neat and clean appearance. In this embodiment, the first canopy fixing part 140 and the socket 130 are formed as one component, however, it should be understood that in other embodiments the first canopy fixing part 140 and the socket 130 may be formed as separate components.

The first canopy fixing part 140 includes a first disc portion 141 and a first canopy rod connecting portion 142. The first disc portion 141 is disposed on a side of the socket 130. The first canopy rod connecting portion 142 has one end connected to an outer circumference of the first disc portion 141, and the other end extends obliquely upward toward the child safety seat and connected to an end of a U-shaped structure of the first canopy rod 210. A hollow accommodating space 143 is disposed at the center of the first disc portion 141, and the accommodating space 143 is used to accommodate at least a part of the second canopy rod fixing part 150, an elastic canopy rod 162, and a cover 160. A plurality of positioning grooves 144 are formed on a circumferential inner wall of the accommodating space 143, and the positioning grooves 144 are used for rotational positioning between the second canopy rod fixing part 150 and the first canopy rod fixing part 140.

Figure 8A:
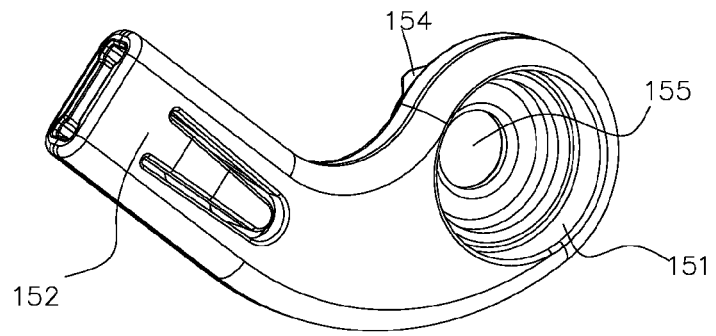
FIGS. 8A and 8B are respectively two perspective views of a second canopy rod fixing part from different angles.
Figure 8B:
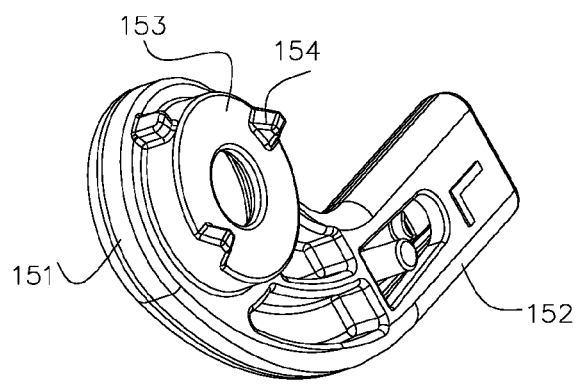

The specific structure of the second canopy rod fixing part 150 will be described with reference to FIGS. 8A-8B.

The second canopy rod fixing part 150 includes a second disc portion 151 and a second canopy connecting portion 152. The second disc portion is a portion rotatably attached to the first canopy fixing part 140. The second canopy connecting portion 152 has one end connected to an outer periphery of the second disc portion 151, and the other end extends obliquely forward toward the child safety seat and connected to an end of a U-shaped structure of the second canopy rod 220. A rotary portion 153 is disposed on a side of the second disc portion 151 facing the first disc portion 141. The rotary portion 153 has a size substantially corresponding to the accommodating space 143 of the first disc portion 141 to be rotatably accommodated in the accommodating space 143. At least one positioning protrusion 154 is disposed on the outer circumference of the rotary portion 153, and the positioning protrusion 154 corresponds to at least one positioning groove 144 on a circumferential inner wall of the accommodating space 143, such that the second canopy rod fixing part 150 can be positioned at one or more specific angular positions with respect to the first canopy rod fixing part 140. A through hole 155 is disposed at the center of the rotary portion 153, such that a part of the cover 160 is connected to the first canopy rod fixing part 140 by passing through the second canopy rod fixing part 150 to form a rotary connection between the second canopy rod fixing part 150 and the first canopy rod fixing part 140.

The elastic canopy rod 162, such as a torsion spring, is disposed between the second disc portion 151 and the first disc portion 141. The elastic canopy rod 162 is used to bias the first canopy rod fixing part 140 and the second canopy rod fixing part 150 to be pivoted toward a closing direction. For the sake of brevity, the arrangement of the elastic canopy rod 162 will not be further discussed here.

The specific assembly of the child safety seat according to the application will be described with reference to FIG. 9A-10B.

Figure 9A:
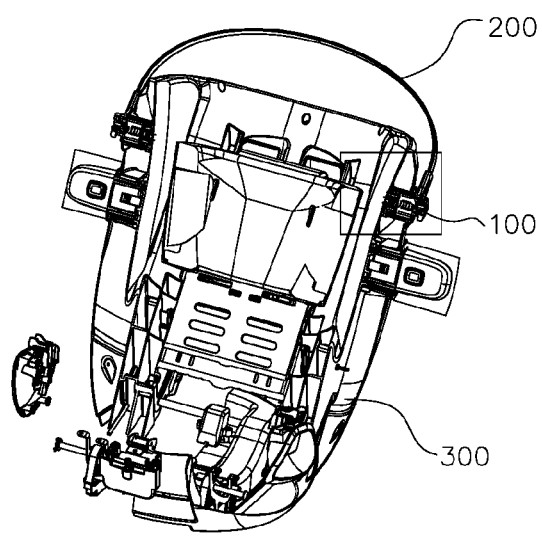
FIG. 9A is a section view taken along the line A-A in FIG. 1.
Figure 9B:
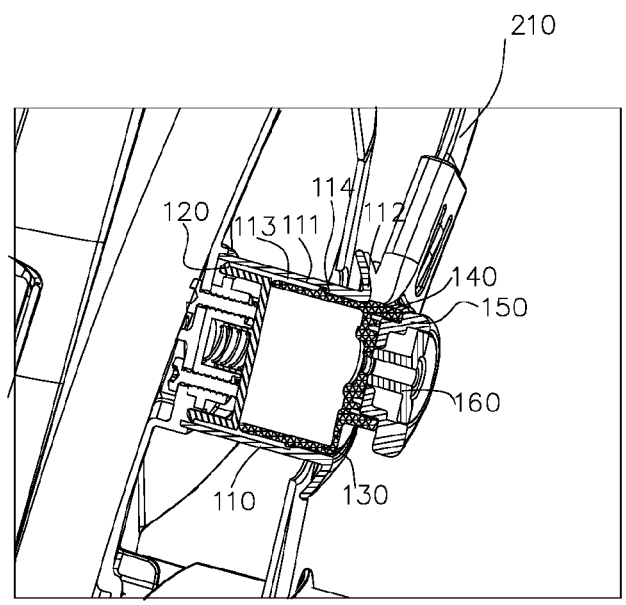
FIG. 9B is a partial enlarged view of the framed part in FIG. 9A.

In the state shown in FIGS. 9A-9B, the socket 130 has been inserted into the fixed seat 110. At this time, the protrusion 132 on the outer wall of the socket 130 clasps on the stop portion 114 on the inner wall of the fixed seat 110 from a side of the accommodating end 1122 to keep the socket 130 inside the fixed seat 110. The hole closing part 120 is pressed by the socket 130 to overcome the biasing force of the elastic hole closing part 161 to move to a vicinity of the accommodating end 1122 of the fixed seat side wall. The first canopy fixing part 140 (and the first canopy rod 210 installed thereon) is close to a side surface of the seat body 300.

Figure 10A:
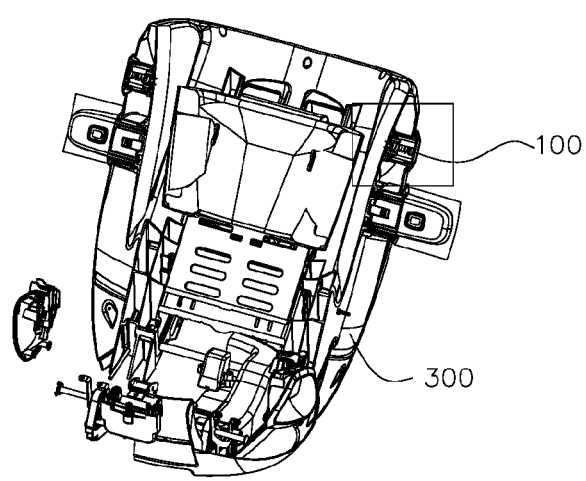
FIG. 10A is a section view taken along the line B-B in FIG. 2.
Figure 10B:
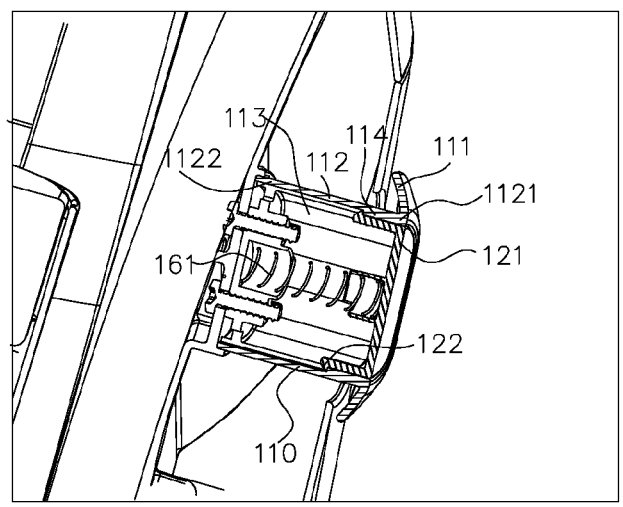
FIG. 10B is a partial enlarged view of the framed part in FIG. 10A.
Figure 11A:
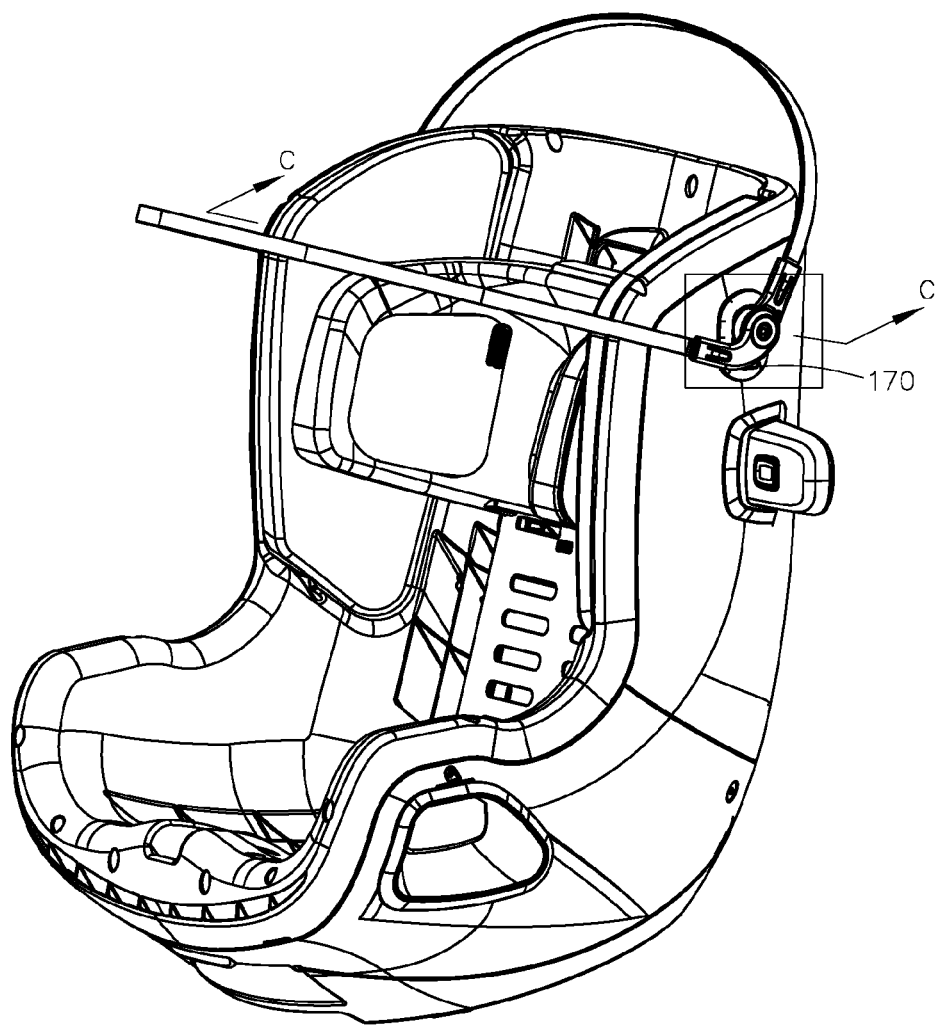
FIG. 11A is a perspective view of an joining structure according to another embodiment of the application.
Figure 11B:
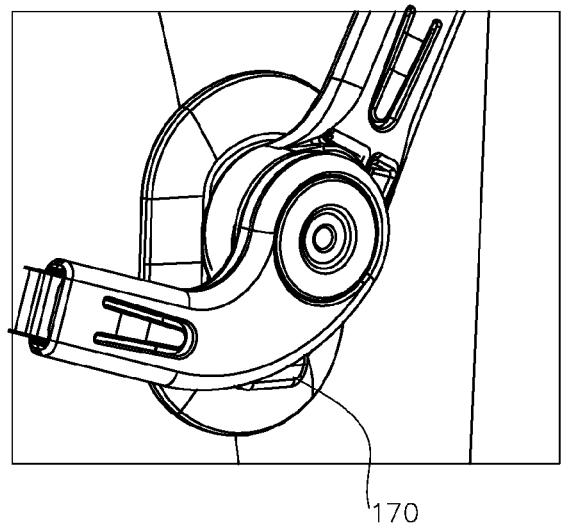
FIG. 11B is a partial enlarged view of the block in FIG. 11A.
Figure 11C:
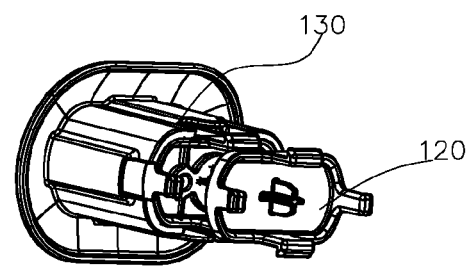
FIG. 11C is a perspective view of a hole closing part and a socket on an opposite side of the block in FIG. 11A.
Figure 12A:
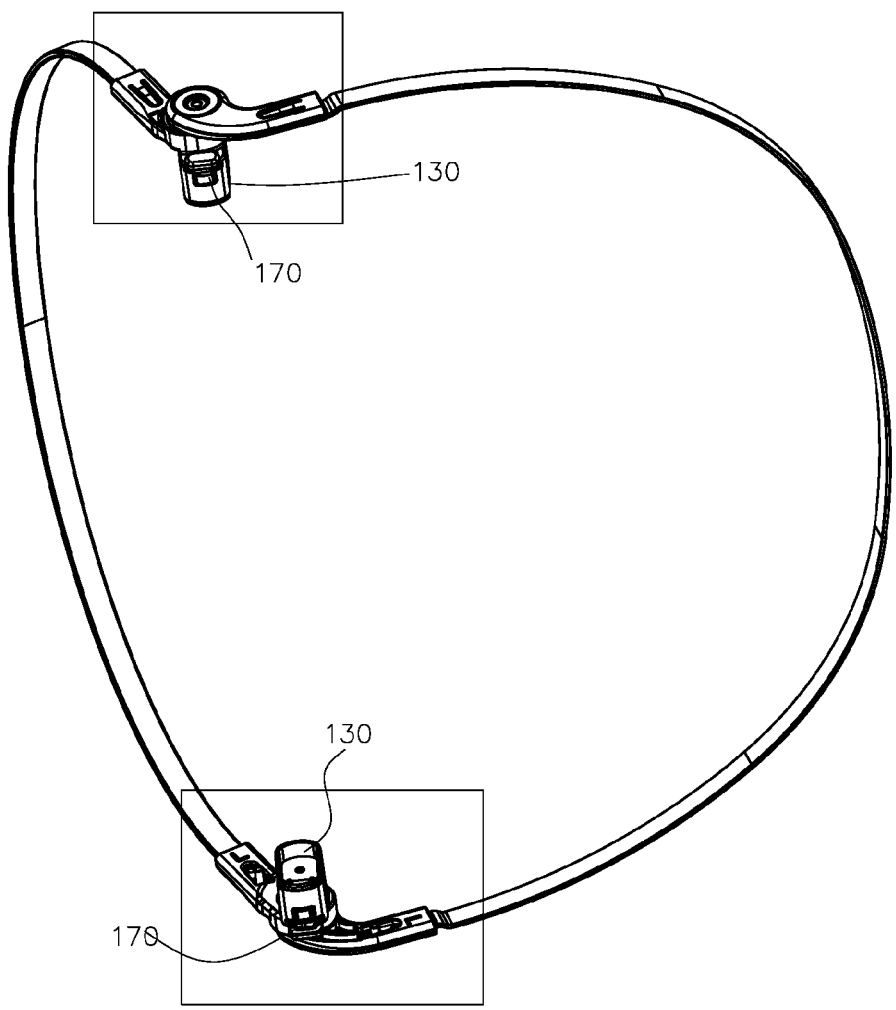
FIG. 12A is a perspective view of the joining structure(s) and the canopy rods in FIG. 11A, in which the canopy rods are in an open state.
Figure 12B:
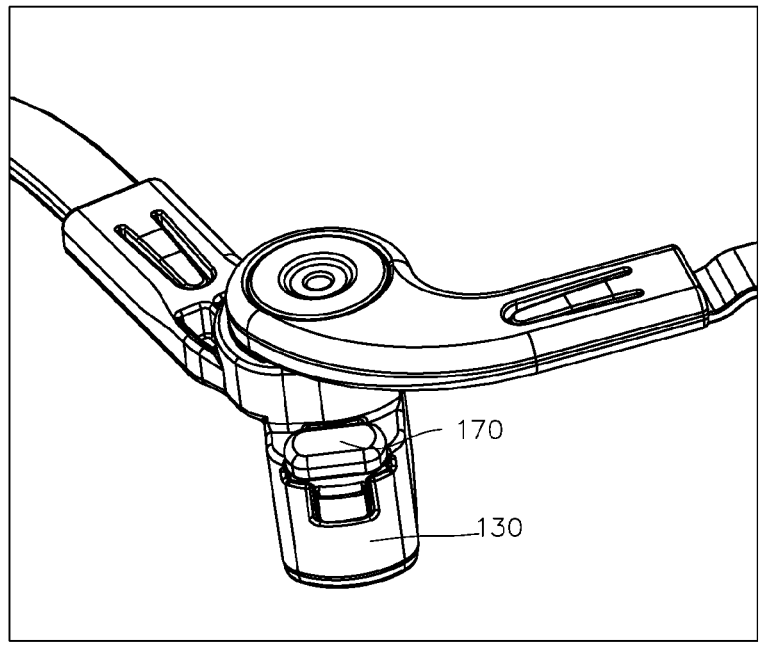
FIGS. 12B and 12C are respectively partial enlarged views of the upper and lower frames in FIG. 12A.
Figure 12C:
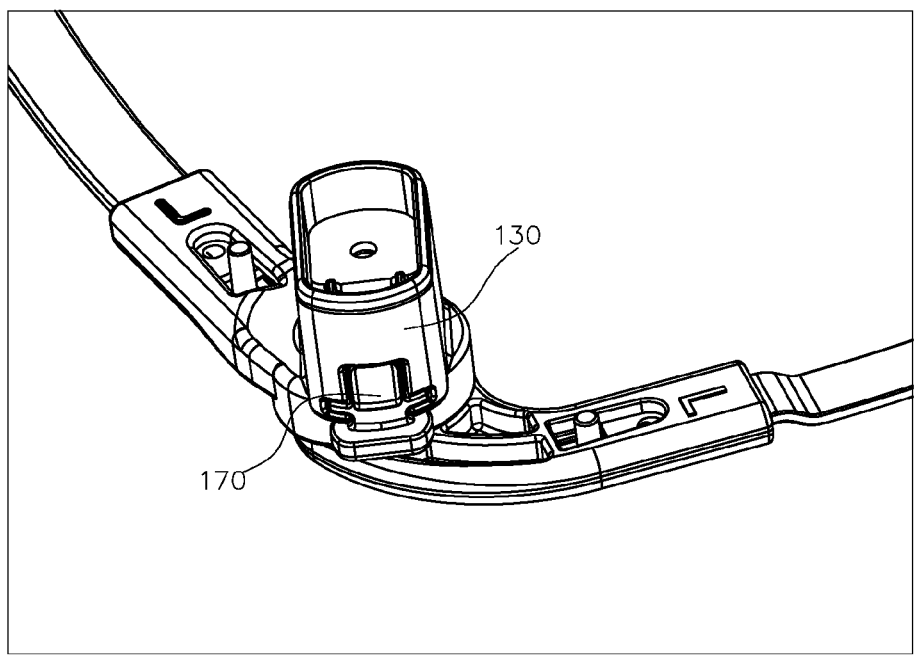
Figure 13A:
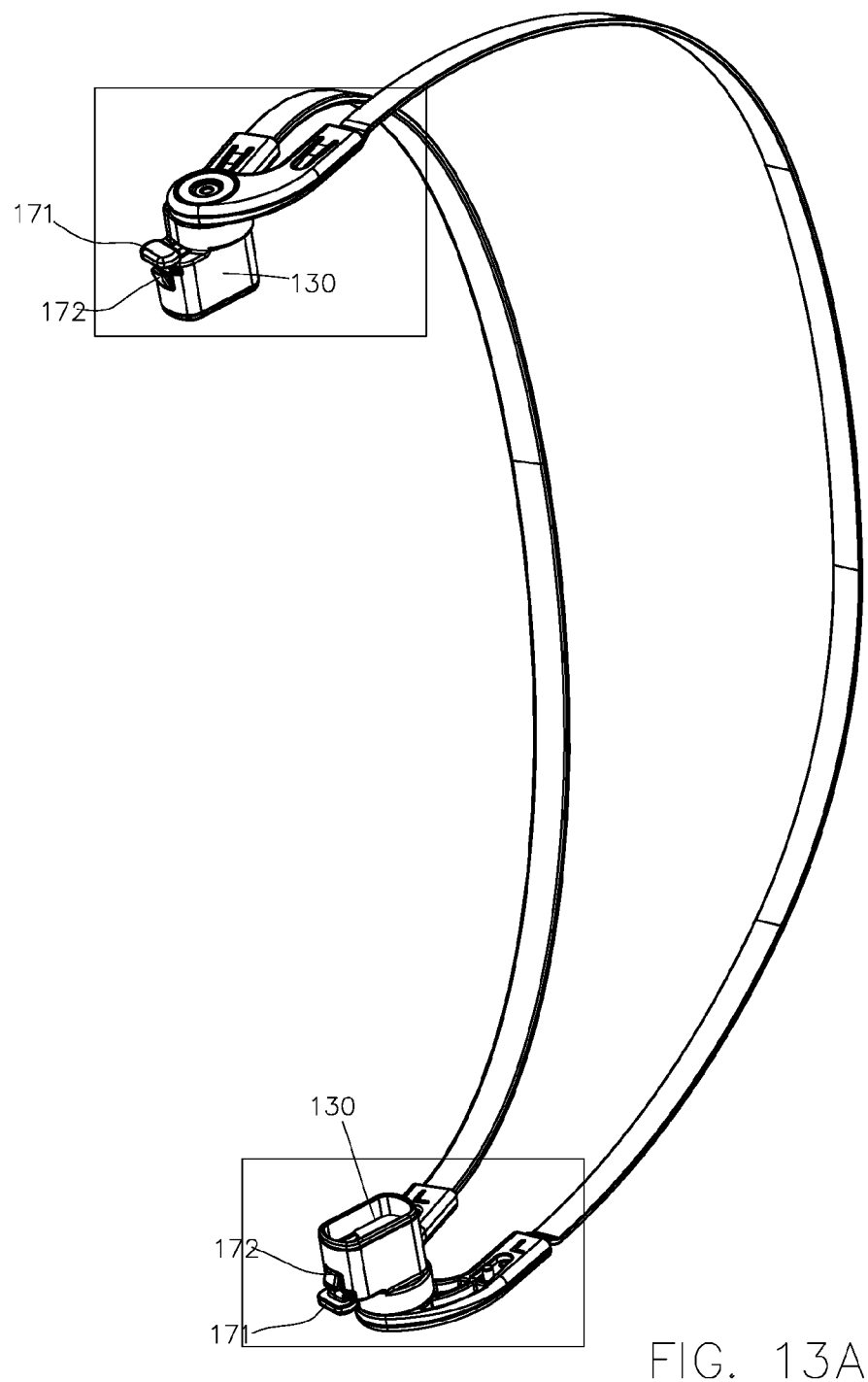
FIG. 13A is a perspective view of the joining structure(s) and the canopy rods in FIG. 11A, in which the canopy rods are in a gathered state.
Figure 13B:
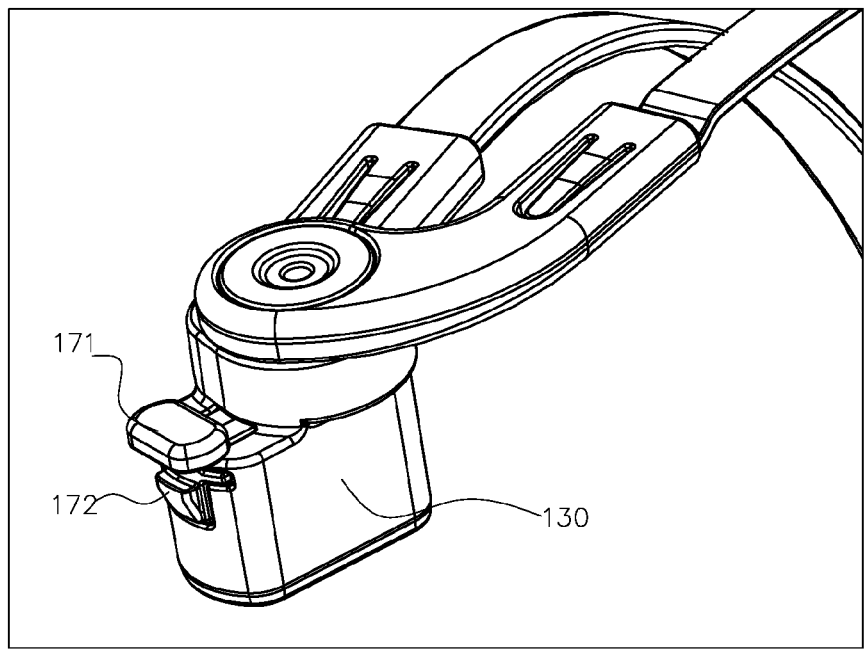
FIGS. 13B and 13C are respectively partial enlarged views of the upper and lower frames in FIG. 13A.
Figure 13C:
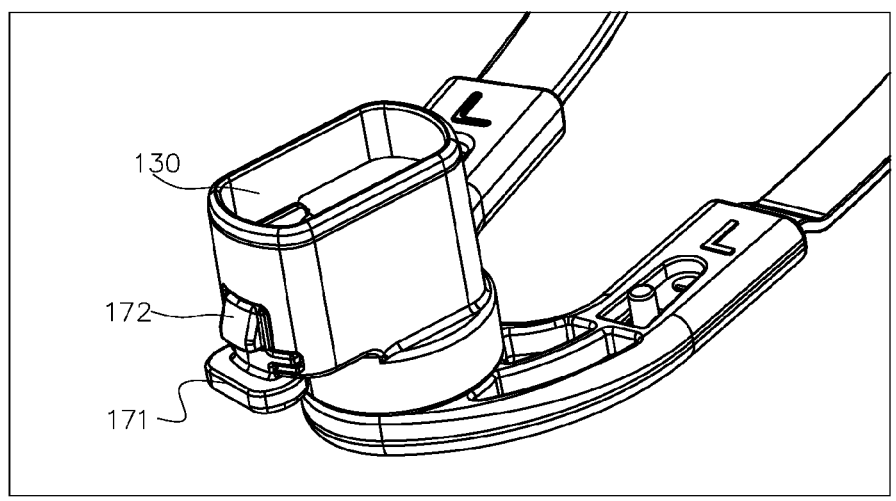
Figure 14A:
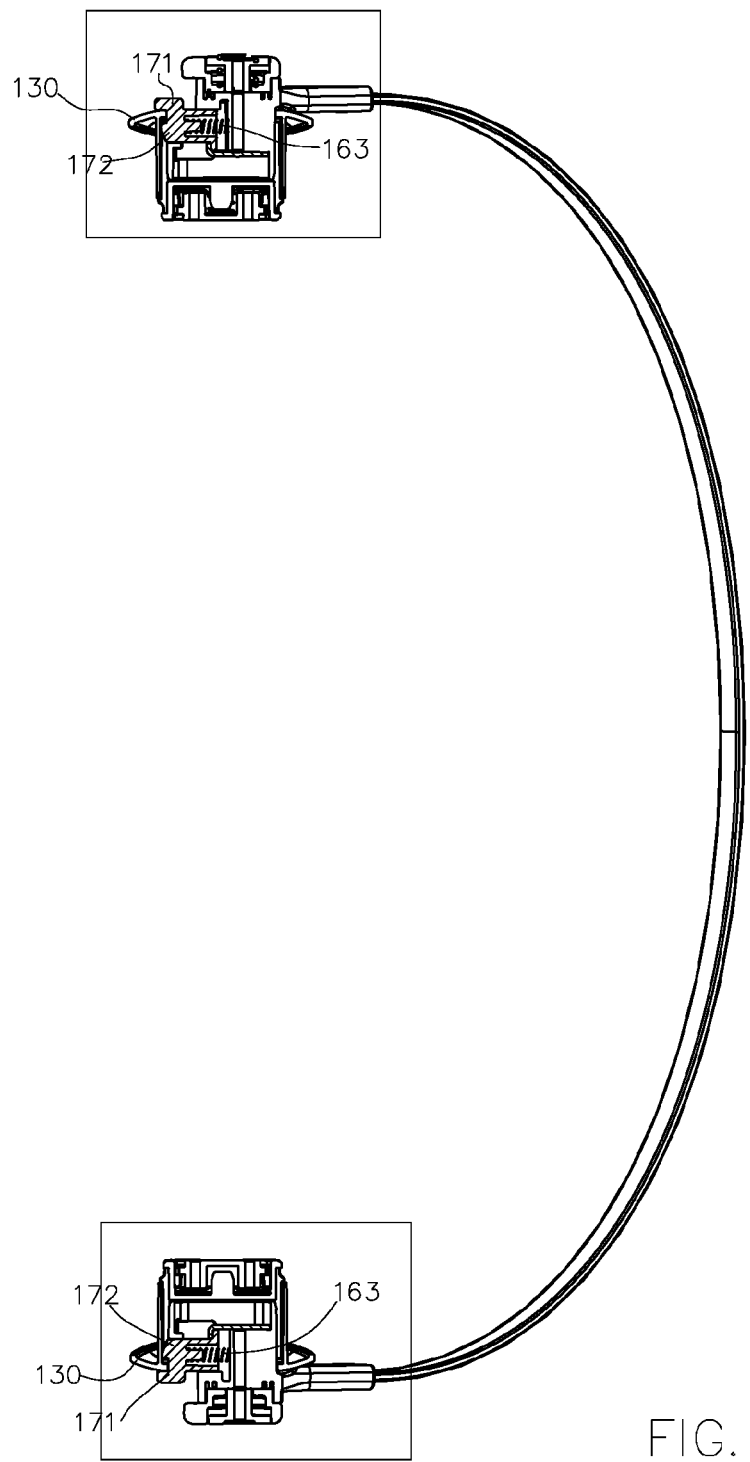
FIG. 14A is a section view taken along the line C-C in FIG. 11A, in which the seat body is omitted.
Figure 14B:
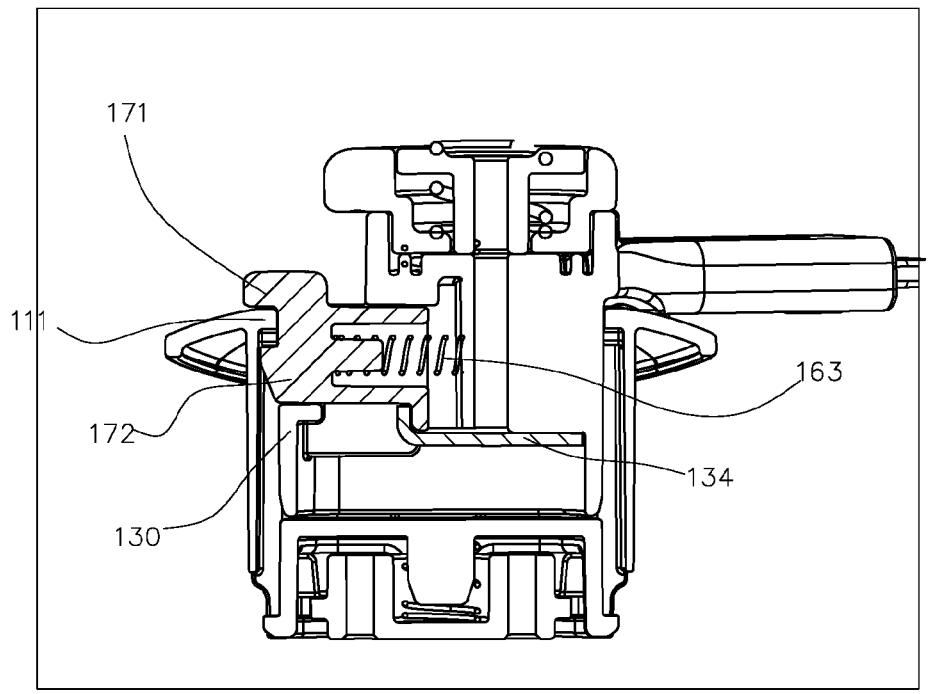
FIGS. 14B and 14C are respectively partial enlarged views of the upper and lower frames in FIG. 14A.
Figure 14C:
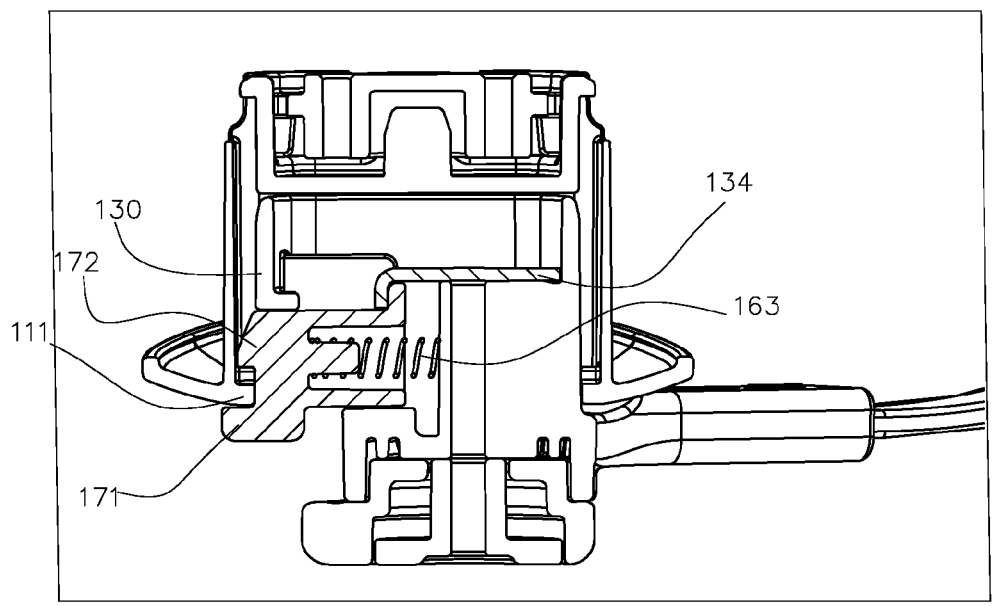

In the state shown in FIGS. 10A-10B, the socket 130 has been pulled out from the fixed seat 110, and the canopy rods have been removed accordingly. At this time, the hole closing part 120 is biased by the elastic hole closing part 161 to move to the open end 1121 of the fixed seat 110. The barb 122 of the hole closing part 120 clasps on the stop portion 114 on the inner wall of the fixed seat 110 from a side of the accommodating end 1122 to keep the hole closing part 120 inside the fixed seat 110. The size of the hole closing part 120 is designed such that when the barb 122 clasps on the stop portion 114, the hole closing surface 121 is flush with the open end 1121. In this way, the hole closing surface 121 closes the open end 1121 of the fixed seat 110. In at least one embodiment, the hole closing surface 121 is exactly flush with the open end 1121.

Another embodiment of the joining structure according to an embodiment of the application will be described with reference to FIGS. 11A to 14C. This embodiment is substantially the same as the previous embodiment, except that the joining structure further has a release button 170. A function of the release button 170 is to facilitate separating the joining structure 100 from the fixed seat 110.

As shown, the release button 170 is disposed on a side of the socket 130, and is partially inserted in the socket 130. More specifically, the release button 170 can slide in a substantially up-and-down direction (i.e., perpendicular to the insertion direction of the socket 130) between a locked position away from the socket 130 and a release position close to the socket 130.

The release button 170 is provided with a pushing portion 171 and a locking portion 172 on the side away from the socket 130. The pushing portion 171 and the locking portion 172 are exposed outside the socket 130, and both are in a form of protruding outward perpendicular to the insertion direction of the socket 130. Furthermore, the locking portion 172 is closer to the fixed seat 110 than the pushing portion 171. The release button 170 is provided with an elastic release button fixing portion 173 on the side facing the socket 130. One end of the elastic release button 163 in a form of a spring is fixed to the elastic release button fixing portion 173, and the other end abuts against an interior of the socket 130 to bias the release button 170 toward the locked position. The socket 130 is also provided with a limit portion 134 which prevents the release button 170 from moving to separate from the socket 130.

In this way, when the socket 130 is inserted into the fixed seat 110, the pushing portion 171 remains outside the fixed seat 110, and the locking portion 172 is inserted into the fixed seat 110 and clasps on an inner side of an edge of the fixed seat 110. Therefore, the release button 170 can hold the socket 130 in the fixed seat 110. When the user needs to release the fixed seat 110, he/she pushes the pushing portion 171 toward the socket 130, and the socket 130 can be easily separated from the fixed seat 110.

In the embodiment provided with the release button 170, the protrusion 132 and the slot 133 are not required to be disposed on the socket 130.

In summary, one or more embodiments of the application provide a joining structure 100, which can easily join a seat body 300 and a canopy 200 of a child safety seat, and will have no obvious holes if the canopy 200 is removed. The joining structures 100 according to the application can provide a substantially neat appearance for the child safety seat, whether or not the canopy 200 is installed. Furthermore, the joining structures 100 of the application are not limited to the use of the child safety seat, and can also be used to join any two objects.

Another embodiment according to the application will be described with reference to FIGS. 15 to 20. As shown, the joining structure 910 according to the other embodiment of the application can be used in a variety of occasions, including but not limited to children's carriers, children's dining chairs, wheelchairs, and recliners. In addition, the joining structure 910 can be attached to various other facilities in addition to the canopy mechanism 50. For sake of brevity, the following description takes as an example that the joining structure is used to a child safety seat and attached to the canopy mechanism 50.

Figure 15:
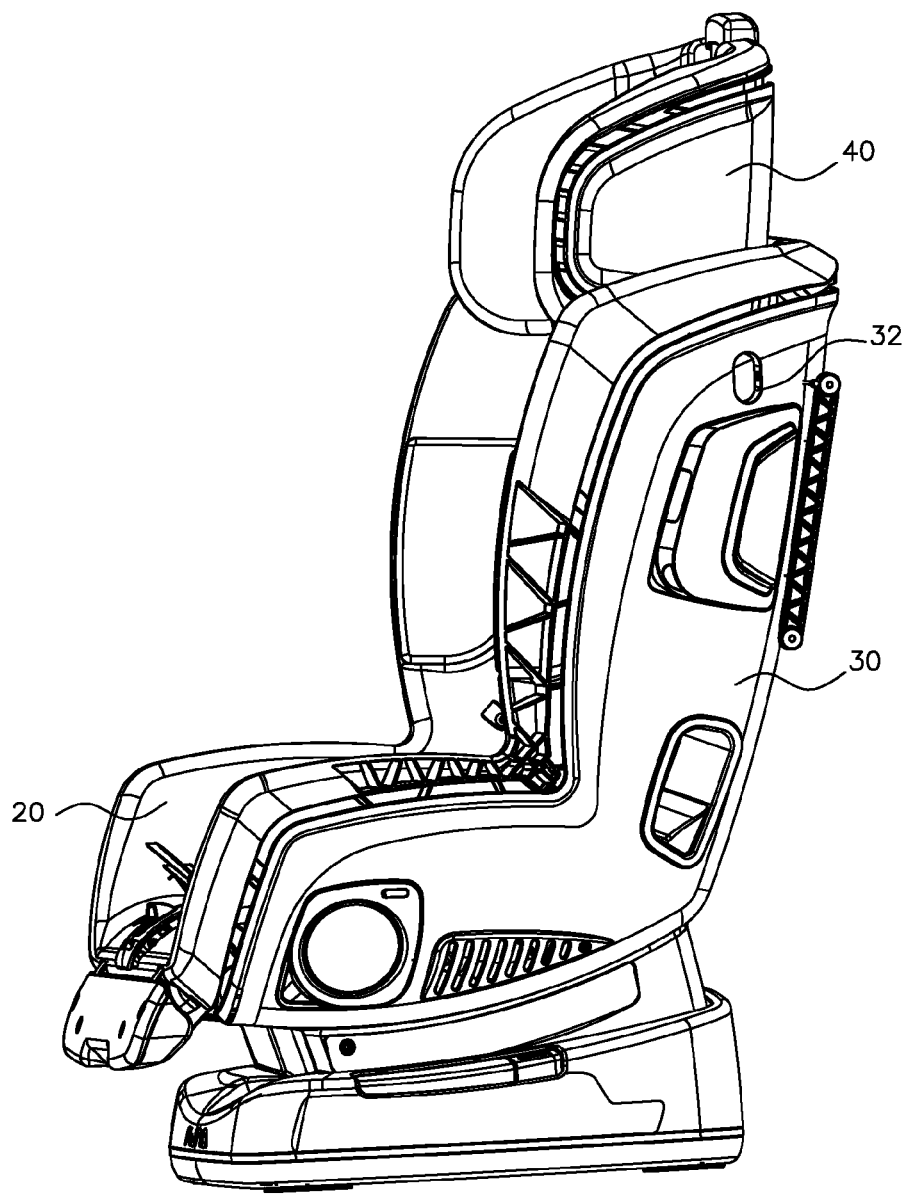
FIG. 15 is a schematic view of the child safety seat according to an embodiment of the application, in which the child safety seat shown is not connected to any canopy mechanism.
Figure 16:
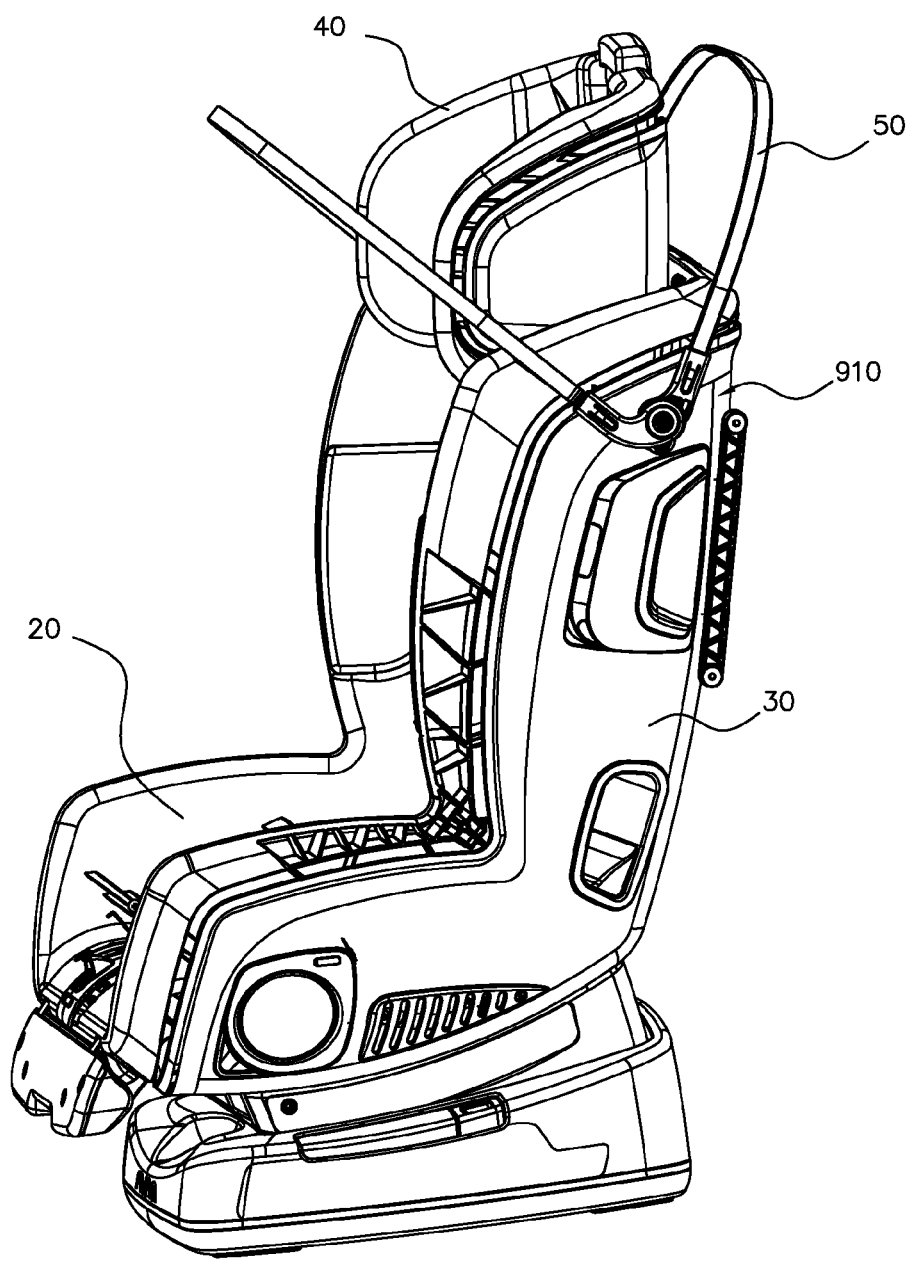
FIG. 16 is a schematic view of the child safety seat according to an embodiment of the application, in which the child safety seat shown is connected to an joining structure inserted therein.

As shown in FIG. 15, which is a schematic view of the child safety seat according to the other embodiment of the application, the child safety seat includes a seat portion 20 and a backrest portion 30. The seat portion 20 and the backrest portion 30 are separated from each other, e.g., by approximately 90 degrees, and enclose a space in which the user sits. Of course, the seat portion 20 and the backrest portion 30 may be separated from each other by other angles. In order to improve sitting comfort, a pillow portion 40 is further disposed at an upper end of the backrest portion 30 on which to rest the user's head.

In addition, in order to shield from sunshine, rain, and wind, or for privacy and safety, there is an increasing trend to additionally arrange a canopy mechanism 50 to a child safety seat. Meanwhile please refer to FIG. 16, which is a schematic view of the child safety seat according to an embodiment of the application, the child safety seat is shown being inserted by and connected to a joining structure 910. Specifically, a fixed seat 32 is disposed on a back of the backrest portion 30. The fixed seat 32, for example, may be in the form of a blind hole, i.e., having an opening and a bottom opposite to the opening. In an embodiment, two fixed seats 32 are disposed symmetrically with respect to a central longitudinal axis of the backrest portion 30. The two fixed seats 32 are respectively inserted by two joining structures 910, and the two joining structures 910 are commonly attached to a canopy mechanism 50. For facilitating illustration, the canopy mechanism 50 is only shown by its main frame structure without its canopy shield.

Figure 17:
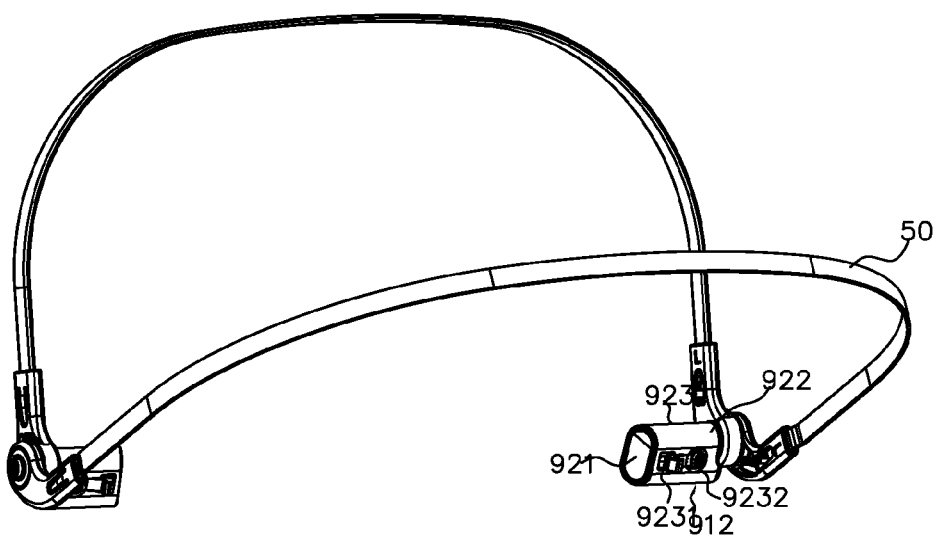
FIG. 17 is a schematic view of the joining structures according to an embodiment of the application, in which the joining structures shown are connected to canopy mechanisms.
Figure 18:
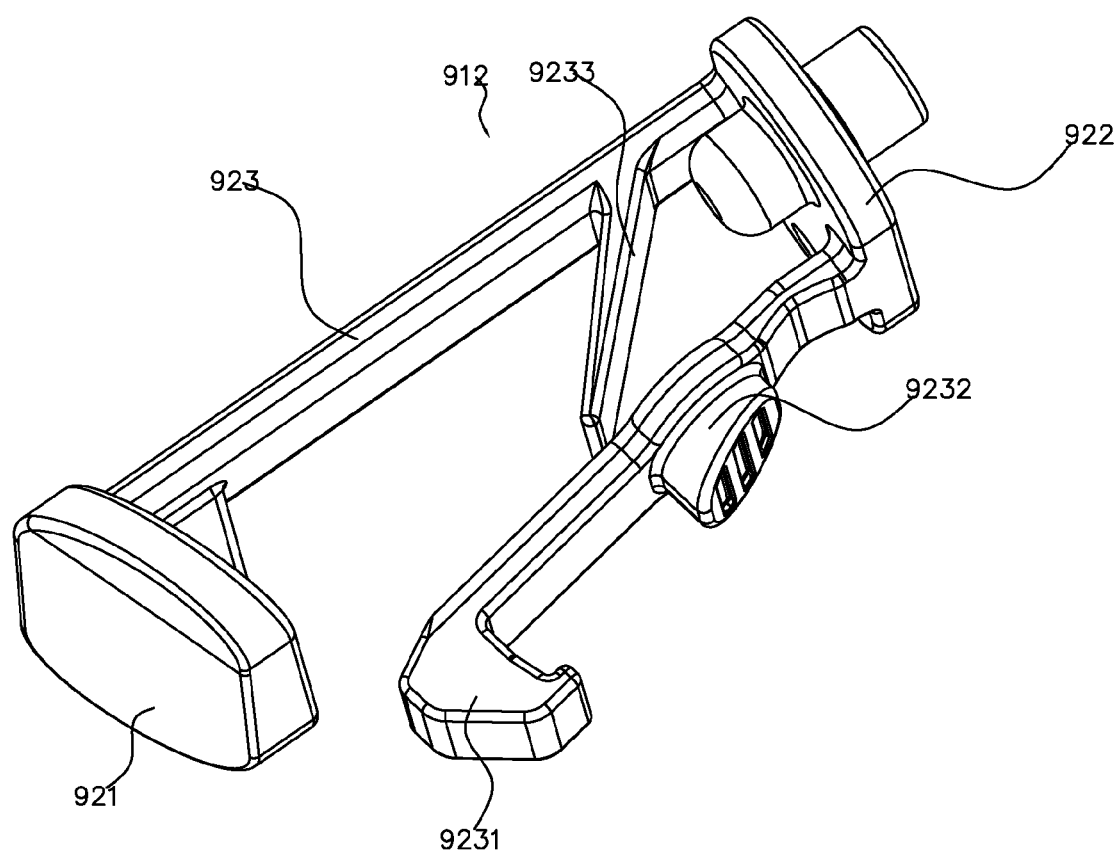
FIG. 18 is a schematic view of a socket of the joining structure according to an embodiment of the application.

The joining structure 910 includes two main parts, that is, a socket 912 and a hole closing part 914. The hole closing part 914 is disposed in the fixed seat 32 arranged on the backrest portion 30, and the socket 912 may be inserted into the fixed seat 32 and detached from the fixed seat 32. Specifically, the hole closing part 914 is always arranged in the fixed seat 32, and the socket 912 abuts against the hole closing part 914 while being inserted into the fixed seat 32. When the socket 912 is detached from the fixed seat 32, the hole closing part 914 moves to block the opening of the fixed seat 32. FIG. 17 schematically shows the socket 912 of the joining structure 910 and the attached canopy mechanism 50. Reference is made to FIG. 18 which is a schematic view of the socket of the joining structure according to the application. The socket 912 includes an abutting end 921, a connecting end 922, and an intermediate section 923 disposed between the abutting end 921 and the connecting end 922. The abutting end 921 abuts against the hole closing part 914 when the socket 912 is inserted into the fixed seat 32, and the connecting end 922 may be attached to, for example, a component of the canopy mechanism 50. The intermediate section 923 is provided with a locking portion 9231, an unlocking portion 9232, and a resetting portion 9233. The locking portion is, for example, in the form of a hook, and extends along a direction substantially perpendicular to the insertion direction of the socket 912. The unlocking portion 9232 and locking portion 9231 may be formed as an integral structure, for example, and in a direction substantially perpendicular to the insertion direction of the socket 912, moving of the unlocking portion 9232 may cause the locking portion 9231 to also move in this direction. The resetting portion 9233 is in the form of an elastic sheet in this embodiment, and the unlocking portion 9232 has to overcome an elastic force of the resetting portion 9232 to move in the direction substantially perpendicular to the insertion direction of the socket 912. Therefore, after the unlocking portion 9232 is released, the resetting portion 9232 in the form of an elastic sheet will release its elastic force to push the locking portion 9231 to reset again, that is, to move to the initial position. The unlocking portion 132 is configured to be exposed outside the fixed seat 32 to facilitate manipulation of the unlocking portion 9232 from the outside of the fixed seat 32. At the same time, in order to avoid slipping, a corrugated structure is disposed on a pressing surface of the unlocking portion 9232 to increase friction.

Figure 19:
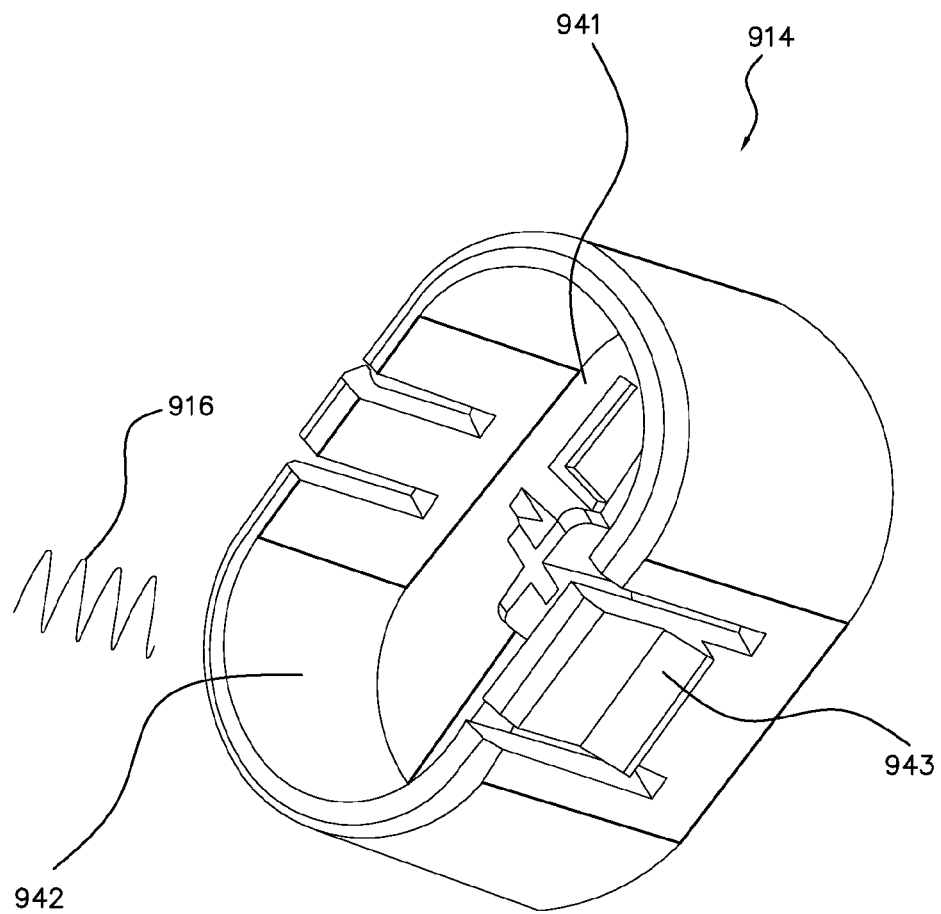
FIG. 19 is a schematic view of a hole closing part of the joining structure according to an embodiment of the application.

FIG. 19 shows the specific structure of the hole closing part 914. In a preferred embodiment, as shown in FIG. 19, the overall structure of the hole closing part 914 is elliptical to fit the elliptical fixed seat 32. Of course, other structural shapes can also be applied to the hole closing part 914 as long as an outer profile of the hole closing part 914 matches a profile of the fixed seat 32. Of course, in order to facilitate manufacturing and reduce costs, the outer profile of the hole closing part may also be smaller than the profile of the fixed seat 32. The hole closing part 914 is in the form of a hood body, that is, the hole closing part 914 includes a cover body 941 and a side wall 942 extending perpendicularly from a periphery of the cover body 941. An engaging part 943 is also disposed on the side wall 942. In addition, in order to allow the hole closing part 914 to move smoothly to block the opening of the fixed seat 32, an elastic member 916 is further disposed to provide a restoring force for the movement of the hole closing part 914. For this, the elastic member 916 is disposed in the hood body of the hole closing part 914, that is, the elastic member 916 is accommodated between the cover body 941 and the bottom opposite to the opening of the fixed seat 32. When the abutting end 921 of the socket 912 inserted in the fixed seat 32 abuts against the cover body 941 of the hole closing part 914, the elastic member 916 is compressed between the cover body 941 of the hole closing part and the bottom of the fixed seat 32. Once the socket 912 is detached from the fixed seat 32, the compressed elastic member 916 provides a restoring force to push the hole closing part 914 to move to block the opening of the fixed seat 32.

Figure 20:
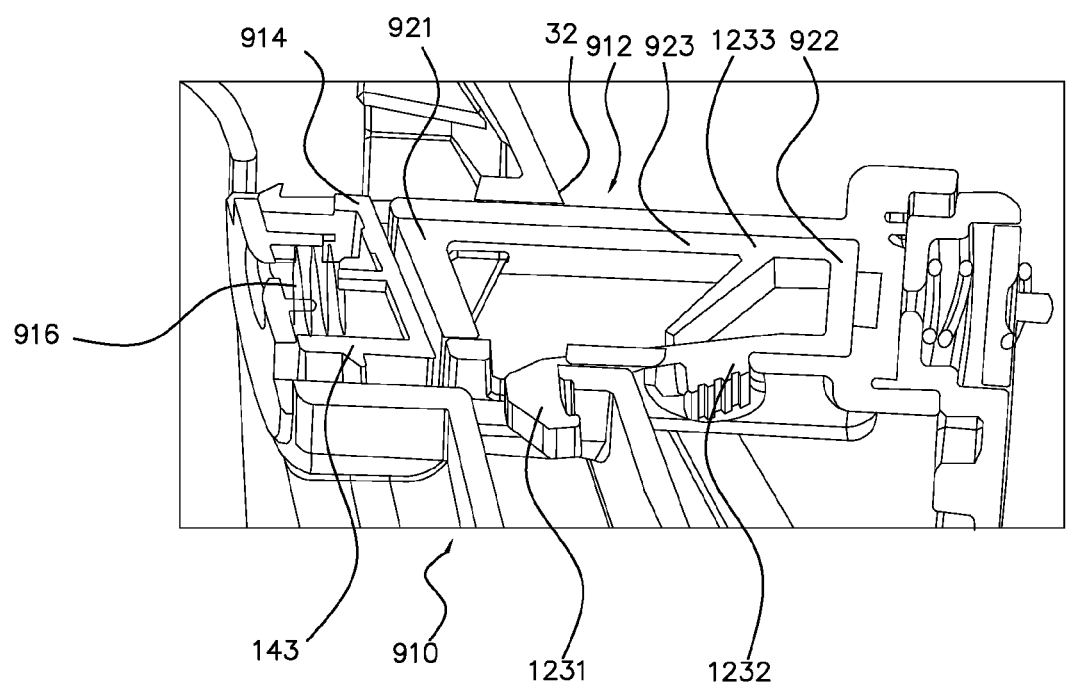
FIG. 20 is a schematic view of the joining structure according to an embodiment of the application, in which a fitting relation between the socket and the hole closing part is shown.

Next, referring to FIG. 20, which is a schematic view of the joining structure 910 according to the application and shows the fitting relation of the socket 912 and the hole closing part 914, the action process of the joining structure 910 according to an embodiment of the application will be described in detail.

The hole closing part 914 is always arranged in the fixed seat 32, and the elastic member 916 is abutted between the bottom of the fixed seat 32 and the hole closing part 914. In the shown embodiment, the elastic member 916 is abutted between the bottom of the fixed seat 32 and the cover body 941 of the hole closing part 914. FIG. 20 shows the state in which the socket 912 is inserted into the fixed seat 32. At this time, the abutting end 921 of the socket 912 abuts against the cover body 914, and the locking portion 9231 of the socket 912 is locked in a clasp structure correspondingly disposed in the fixed seat 32. The canopy mechanism 50 to which the connecting end 922 of the socket 912 is attached is connected to the child safety seat in this state.

If the canopy mechanism 50 is not used for a long time or needs to be cleaned, the unlocking portion 9232 may be pressed in a direction substantially perpendicular to the insertion direction of the socket 912 from the outside of the fixed seat 32, so the unlocking portion 9232 moves in the direction substantially perpendicular to the insertion direction. Since the unlocking portion 9232 and the locking portion 9231 are formed as an integral structure, under moving of the unlocking portion 9232, the locking portion 9231 also moves in the direction substantially perpendicular to the insertion direction, thus the locking portion 9231 is separated from the clasp structure correspondingly arranged in the fixed seat 32, and the socket 912 and the canopy mechanism 50 attached thereto can be detached at this time.

When the canopy mechanism 50 needs to be attached again, the socket 912 is inserted into the fixed seat again while pressing the unlocking portion 9232. During the process of pressing the unlocking portion 9232, the resetting portion 9233 will be compressed. Therefore, when the locking portion 9232 is released after the socket 912 is inserted in place, the locking portion 9231 will again cooperate with the corresponding clasp structure in the fixed seat 32 under the action of the restoring force of the resetting portion 9233 to lock the socket 912. In this way, the canopy mechanism 50 connected to the connecting end 922 of the socket 912 is connected to the child safety seat again.

In the joining structure 910 according to an embodiment of the application, the hole closing part 914 is always arranged in the fixed seat 32. Therefore, when the canopy mechanism 50 needs to be detached, even if the socket 912 has been detached from the fixed seat 32, the hole closing part 914 can still move under the action of the elastic force of the elastic member 916 to block the opening of the fixed seat 32, thus improving the overall appearance aesthetically after the socket 912 is detached, and at the same time, user's fingers and the like can be prevented from accidentally being injured by the fixed seat, thus improving safety.

To facilitate the detachment and installation of the canopy to adapt to usage requirements in different environments, it is beneficial in accordance with one or more embodiments for a child safety seat to have a joining structure between the canopy and the seat. In at least some embodiments, the joining structure is usable to quickly join and detach the canopy and, when the canopy is detached, the joining structure remains aesthetically clean without showing obvious holes. In at least some embodiments, detachment of the canopy is beneficial when the canopy mechanism is not used for a long time or has to be cleaned. A joining structure according to one or more embodiments of the application is used to separably join a first object to a second object. The joining structure comprises: a fixed seat connected to the first object, the fixed seat has a cylindrical fixed seat side wall, and the fixed seat side wall has an open end and an accommodating end disposed opposite to each other; a socket connected to the second object, the socket has a cylindrical socket side wall, the socket being insertable into the fixed seat side wall through the open end along an insertion direction, so as to join the second object to the first object; a hole closing part disposed inside the fixed seat side wall, located between the accommodating end and the socket of the fixed seat, and being movable between the open end and the accommodating end, the hole closing part has a hole closing surface at the open end, and the hole closing surface has a shape corresponding to a cross-sectional shape of the fixed seat side wall at the open end; an elastic hole closing part disposed between the hole closing part and the accommodating end, and used to apply a force biasing the hole closing part toward the open end, such that the hole closing part elastically abuts against the socket; and when the socket is not inserted into the fixed seat, the hole closing part is biased to the open end by the elastic hole closing part; and when the socket is not inserted into the fixed seat, the hole closing part is pushed toward the accommodating end by the socket separate from the open end.

In an embodiment, a stop portion is disposed on an inner side of the fixed seat side wall, and the stop portion is located at a position between the open end and the accommodating end and protrudes inwardly from the inner side of the fixed seat side wall; a protrusion is disposed on an outer side of the socket side wall, and the protrusion protrudes outward from the outer side of the socket side wall; and when the socket is inserted into the fixed seat, the protrusion is able to transit the stop portion to enter the fixed seat, and abuts against the stop portion from a side of the accommodating end to prevent the socket from being separated from the fixed seat.

In an embodiment, the stop portion is provided by a plurality of stop portions, and the plurality of stop portions form a circle along an inner circumference of the fixed seat side wall or are symmetrically disposed on the inner circumference of the fixed seat side wall.

In an embodiment, a barb is disposed on the hole closing part, the barb extends from the hole closing surface toward the accommodating end and has a hook at an end, and the hook protrudes toward the fixed seat side wall; the barb is configured such that when the hole closing part is biased to the open end by the elastic hole closing part, the barb abuts against the stop portion from a side of the accommodating end to prevent the hole closing part from being separated from the fixed seat.

In an embodiment, the fixed seat side wall has a cross section substantially in a shape of a rectangle, and the stop portions are disposed on each long side and each short side of the rectangle; and the socket side wall has a plurality of protrusions corresponding to the stop portions, and the hole closing part has a plurality of barbs arranged corresponding to the stop portions on the long side and/or the short side.

In an embodiment, the protrusion extends on the socket side wall along a direction perpendicular to the insertion direction and, at both ends of the protrusion, a slot parallel to the insertion direction is respectively disposed on the socket side wall.

In an embodiment, the joining structure further includes a release button disposed on the socket side wall and partially inserted in the socket, the release button is slidable between a locked position away from the socket and a release position close to the socket along a direction perpendicular to the insertion direction of the socket to selectively lock the socket to the fixed seat.

In an embodiment, the release button includes: a pushing portion, protruding outward perpendicular to the insertion direction of the socket on a side away from the socket; and a locking portion, protruding outward perpendicular to the insertion direction of the socket on a side away from the socket, and is closer to the fixed seat than the pushing portion; and when the socket is inserted into the fixed seat, the pushing portion remains outside the fixed seat, and the locking portion is inserted into the fixed seat and clasps on an inner side of the stop portion of the fixed seat.

In an embodiment, the fixed seat further includes a fixed seat edge, and the fixed seat edge extends outward from an edge of the open end of the fixed seat side wall; and when the socket is not inserted into the fixed seat, the hole closing surface of the hole closing part is substantially flush with the fixed seat edge.

In an embodiment, in the insertion direction of the socket, a sum of lengths of the socket and the hole closing part is substantially equal to a length of the fixed seat, such that when the socket is inserted into the fixed seat, the hole closing part abuts against the accommodating end of the fixed seat.

Another purpose of an embodiment of the application is to provide a joining structure and a child safety seat including the joining structure. The joining structure can be used to attach a canopy mechanism to a child safety seat, and the joining structure can also be detached from the child safety seat together with the canopy mechanism. Furthermore, after the detachment, the hole closing part of the joining structure can block the fixed seat into which the socket was inserted, which improves the overall aesthetics and safety.

Thus, according to an embodiment of the application, a joining structure is provided. The joining structure includes: a socket, inserted and connected to a fixed seat of a device, and being detachable from the fixed seat; a hole closing part, movably arranged in the fixed seat, abutting against the socket when the socket is inserted into the fixed seat of the device, and movable to block an opening of the fixed seat when the socket is detached from the fixed seat.

In an embodiment, the socket includes an abutting end, a connecting end, and an intermediate section disposed between the abutting end and the connecting end, the abutting end abuts against the hole closing part, and the connecting end is used to connect accessories of the device.

In an embodiment, the intermediate section is provided with a locking portion, an unlocking portion, and a resetting portion, the locking portion is used to lock the socket to the fixed seat of the device, the unlocking portion is exposed outside the fixed seat for unlocking the socket from being locked to the fixed seat, and the resetting portion is used to reset the locking portion.

In an embodiment, the locking portion is in a form of a hook, the hook extends in a direction substantially perpendicular to an insertion direction of the socket, so as to be locked in a clasp structure correspondingly disposed in the fixed seat when the socket is inserted into the fixed seat; and the unlocking portion and the locking portion are formed as an integral structure, and the locking portion is movable by moving the unlocking portion in a direction substantially perpendicular to the insertion direction of the socket.

In an embodiment, the unlocking portion is in a form of a button with a corrugated surface, and the resetting portion is in a form of a resetting elastic sheet abutting against the unlocking portion.

In an embodiment, an outer profile of the hole closing part is formed to match a profile of the fixed seat of the device.

In an embodiment, the joining structure further includes an elastic member, and the elastic member is disposed between the hole closing part and a bottom of the fixed seat opposite to the opening, or at a bottom of the hole closing part.

In an embodiment, the hole closing part is in the form of a hood body, including a cover body and a side wall perpendicularly extending from a periphery of the cover body, and an engaging part is disposed on the side wall.

In an embodiment, the elastic member is disposed in a space surrounded by the side wall of the hole closing part, and is abutted between the cover body and the bottom of the fixed seat.

According to another aspect of the application, a child safety seat including the above joining structure is provided. Such a child safety seat also includes a seat portion, a backrest portion, and a pillow portion. The backrest portion is formed with a fixed seat, the joining structure is inserted into the fixed seat, and the joining structure is connected to a canopy mechanism.

In an embodiment, the canopy mechanism is connected to two joining structures mentioned above. Two fixed seats are formed on a back of the backrest portion, and the two joining structures are respectively inserted into the two fixed seats.

A child safety seat according to an embodiment of the application is provided, which includes: a seat body; and a canopy, being able to be joined to an upper part of the seat body. Moreover, in the joining structure according to the embodiment of the application, the first object is the seat body, and the second object is the canopy; two joining structures are respectively arranged on both sides of the seat body, the accommodating end of each of the fixed seats is embedded into the seat body from a corresponding side of the seat body, and the open end of each of the fixed seats is exposed on the side of the seat body.

In an embodiment, the canopy includes a first canopy rod and a second canopy rod both being substantially U-shaped, and each of the joining structures includes a first canopy rod fixing part and a second canopy rod fixing part, wherein the first canopy rod fixing part is fixed on the socket of the corresponding one of the two joining structures, and the second canopy rod fixing part is pivotally connected to the first canopy rod fixing part; both ends of the first canopy rod are respectively fixedly connected to the first canopy rod fixing parts of the corresponding one of the two joining structures, and both ends of the second canopy rod are respectively fixedly connected to the second canopy rod fixing part of the corresponding one of the two joining structures, such that the second canopy rod is rotatable around an axis parallel to the insertion direction of the socket with respect to the first canopy rod.

For the joining structure according to the embodiment of the application and the child safety seat including the joining structure, after the socket of the joining structure is detached, the hole closing part of the joining structure can still block the fixed seat into which the socket was inserted. Therefore, even after the socket is detached, the overall aesthetical appearance and safety can still be maintained.

Since this application can be implemented in various forms without departing from the spirit and essence of the application, it should be understood, the embodiments are not limited to any of the foregoing details, but should be interpreted in the broadest sense within the scope defined by the claims. Therefore, all changes falling within the scope of the claims or their equivalents shall be covered by the claims.

LIST OF REFERENCE SIGNS

100 JOINING STRUCTURE
  110 FIXED SEAT
    111 FIXED SEAT EDGE
    112 FIXED SEAT SIDE WALL
      1121 OPEN END
      1122 ACCOMMODATING END
    114 STOP PORTION
  120 HOLE CLOSING PART
    121 HOLE CLOSING SURFACE
    122 BARB
  130 SOCKET
    131 SOCKET SIDE WALL
    132 PROTRUSION
    133 SLOT
    134 LIMIT PORTION
  140 FIRST CANOPY ROD FIXING PART
    141 FIRST DISC PORTION
    142 FIRST CANOPY ROD CONNECTING PORTION
    143 ACCOMMODATING SPACE
    144 POSITIONING GROOVE
  150 SECOND CANOPY ROD FIXING PART
    151 SECOND DISC PORTION
    152 SECOND CANOPY ROD CONNECTING PORTION
    153 ROTARY PORTION
    154 POSITIONING PROTRUSION
    155 THROUGH HOLE
  160 COVER
    161 ELASTIC HOLE CLOSING PART
    162 ELASTIC CANOPY ROD
    163 ELASTIC RELEASE BUTTON
  170 RELEASE BUTTON
    171 PUSHING PORTION
    172 LOCKING PORTION
    173 ELASTIC RELEASE BUTTON MOUNTING PORTION
200 CANOPY
  210 FIRST CANOPY ROD
  220 SECOND CANOPY ROD
300 SEAT BODY
  301 CASE
  302 HEADREST PORTION
  303 BACKREST PORTION
  304 SEAT PORTION
  305 OPENING AND ACCOMMODATING SPACE
  910: JOINING STRUCTURE
    912 SOCKET
      921 ABUTTING END
      922 CONNECTING END
      923 INTERMEDIATE SECTION
        9231 LOCKING PORTION
        9232 UNLOCKING PORTION
        9233 RESETTING PORTION
    914 HOLE CLOSING PART
      941 COVER BODY
      942 SIDE WALL
      943 ENGAGING PART
    916 ELASTIC MEMBER
  20: SEAT PORTION
  30: BACKREST PORTION
  32 FIXED SEAT
  40: HEAD PILLOW PORTION
  50: CANOPY MECHANISM

What is claimed is:

1. A joining structure for detachably joining a first object to a second object, comprising:
    a fixed seat connected to the first object, the fixed seat comprising a fixed seat side wall, and the fixed seat side wall has an open end and an accommodating end opposite each other;
    a socket connected to the second object, the socket comprising a socket side wall and insertable into the fixed seat side wall through the open end to join the second object to the first object;
    a hole closing part inside the fixed seat side wall, located between the accommodating end and the socket, and movable between the open end and the accommodating end, the hole closing part comprising a hole closing surface at the open end, and the hole closing surface comprising a shape corresponding to a cross-sectional shape of the fixed seat side wall at the open end; and
    an elastic hole closing part disposed between the hole closing part and the accommodating end, and configured to apply a force biasing the hole closing part toward the open end, such that the hole closing part elastically abuts against the socket,
  wherein
    when the socket is inserted into the fixed seat, the hole closing part is biased by the elastic hole closing part of the socket to move toward the accommodating end, and when the socket is removed from the fixed seat, the hole closing part is biased to move to the open end by the elastic hole closing part.

2. The joining structure according to claim 1, further comprising:
    a stop portion disposed on an inner side of the fixed seat side wall, wherein the stop portion is located at a position between the open end and the accommodating end and protrudes inwardly from the inner side of the fixed seat side wall;
a protrusion disposed on an outer side of the socket side wall, wherein the protrusion protrudes outward from the outer side of the socket side wall; and
when the socket is inserted into the fixed seat, the protrusion being able to transit the stop portion and enter the fixed seat, and abut against the stop portion from a side of the accommodating end to prevent the socket from being separated from the fixed seat.

3. The joining structure according to claim 2, further comprising
a plurality of stop portions forming a circle along an inner circumference of the fixed seat side wall or symmetrically dispersing on the inner circumference of the fixed seat side wall.

4. The joining structure according to claim 2, further comprising
a barb disposed on the hole closing part, wherein the barb extends from the hole closing surface toward the accommodating end and has a hook at an end, and the hook protrudes toward the fixed seat side wall; and
the barb is configured such that when the hole closing part is biased to the open end by the elastic hole closing part, the barb abuts against the stop portion from a side of the accommodating end to prevent the hole closing part from separating from the fixed seat.

5. The joining structure according to claim 3, wherein:
the fixed seat side wall has a cross section substantially in a shape of a rectangle, and the plurality of stop portions are disposed on each long side and each short side of the rectangle; and
the socket side wall has a plurality of protrusions corresponding to the plurality of stop portions on the long side and/or the short side, and the hole closing part has a plurality of barbs arranged corresponding to the plurality of stop portions on the long side and/or the short side.

6. The joining structure according to claim 2, wherein:
the protrusion extends on the socket side wall along a direction perpendicular to the insertion direction and, at both ends of the protrusion, two slots parallel to the insertion direction are disposed on the socket side wall.

7. The joining structure according to claim 1, further comprising a release button disposed on the socket side wall and partially inserted in the socket, wherein the release button is slidable between a locked position away from the socket and a release position close to the socket along a direction perpendicular to the insertion direction of the socket to selectively lock the socket to the fixed seat.

8. The joining structure according to claim 7, wherein:
the release button includes:
a pushing portion, protruding outward perpendicular to the insertion direction of the socket on a side of the release button away from the socket; and
a locking portion, the locking portion protruding outward perpendicular to the insertion direction of the socket on a side of the release button away from the socket, and the locking portion being closer to the fixed seat than the pushing portion; and
when the socket is inserted into the fixed seat, the pushing portion remaining outside the fixed seat, and the locking portion inserted into the fixed seat and engaging with an inner side of a stop portion disposed on the fixed seat side wall.

9. The joining structure according to claim 1, wherein:
the fixed seat further includes a fixed seat edge, and the fixed seat edge extends outward from an edge of the open end of the fixed seat side wall; and
when the socket is not inserted into the fixed seat, the hole closing surface of the hole closing part is substantially flush with the fixed seat edge.

10. The joining structure according claim 1, wherein:
in the insertion direction of the socket, a sum of lengths of the socket and the hole closing part is substantially equal to a length of the fixed seat, such that when the socket is inserted into the fixed seat, the hole closing part abuts against the accommodating end of the fixed seat.

11. A joining structure, comprising:
a socket, inserted and connected to a fixed seat of a device, and detachable from the fixed seat; and
a hole closing part, movably arranged in the fixed seat, abutting against the socket when the socket is inserted into the fixed seat of the device, and movable to block an opening of the fixed seat when the socket is detached from the fixed seat,
wherein the socket includes a locking portion configured to lock the socket to the fixed seat of the device, and an unlocking portion exposed outside the fixed seat for unlocking the socket from being locked to the fixed seat.

12. The joining structure according to claim 11, wherein the socket includes an abutting end, a connecting end, and an intermediate section disposed between the abutting end and the connecting end, the abutting end abuts against the hole closing part, and the connecting end is configured to connect accessories of the device.

13. The joining structure according to claim 12, wherein the intermediate section comprises the locking portion, the unlocking portion, and a resetting portion, and the resetting portion is configured to reset the locking portion.

14. The joining structure according to claim 13, wherein the locking portion is in a form of a hook, the hook extends in a direction substantially perpendicular to an insertion direction of the socket, so as to be locked in an engaging structure correspondingly disposed in the fixed seat when the socket is inserted into the fixed seat; and the unlocking portion and the locking portion are formed as an integral structure, and the locking portion is movable by moving the unlocking portion in a direction substantially perpendicular to the insertion direction of the socket.

15. The joining structure according to claim 14, wherein the unlocking portion is in a form of a button, and the resetting portion in a form of a resetting elastic sheet abutting against the unlocking portion.

16. The joining structure according to claim 11, wherein an outer profile of the hole closing part is formed to match a profile of the fixed seat of the device.

17. The joining structure according to claim 11, wherein the joining structures further comprise an elastic member, and the elastic member is disposed between the hole closing part and a bottom of the fixed seat opposite to the opening, or at a bottom of the hole closing part.

18. The joining structure according to claim 17, wherein the hole closing part is in a form of a hood, and comprises a cover body and a side wall perpendicularly extending from a periphery of the cover body, and an engaging part is disposed on the side wall.

19. The joining structure according to claim 18, wherein the elastic member is disposed in a space surrounded by the side wall of the hole closing part, and abuts between the cover body and the bottom of the fixed seat.

20. A child safety seat, comprising:
a seat body;
a canopy, the canopy joinable to an upper part of the seat body;
the joining structure according to claim 1, wherein the first object is the seat body, and the second object is the canopy; and
two joining structures are arranged on both sides of the seat body, the accommodating end of each of the fixed seats is embedded into the seat body from a corresponding side of the seat body, and the open end of each of the fixed seats is exposed on the side of the seat body.

21. The child safety seat according to claim 20, wherein:
the canopy comprises a first canopy rod and a second canopy rod both being substantially U-shaped, and each of the joining structures comprises a first canopy rod fixing part and a second canopy rod fixing part, wherein the first canopy rod fixing part is fixed on the socket of the corresponding one of the two joining structures, and the second canopy rod fixing part is pivotally connected to the first canopy rod fixing part; and
wherein both ends of the first canopy rod are fixedly connected to the first canopy rod fixing parts of the corresponding one of the two joining structures, and both ends of the second canopy rod are fixedly connected to the second canopy rod fixing part of the corresponding one of the two joining structures, such that the second canopy rod is rotatable around an axis parallel to the insertion direction of the socket in respect to the first canopy rod.

* * * * *